(12) United States Patent
Gupta et al.

(10) Patent No.: US 9,609,233 B2
(45) Date of Patent: Mar. 28, 2017

(54) METHOD AND SYSTEM FOR LUMINANCE ADJUSTMENT OF IMAGES IN AN IMAGE SEQUENCE

(71) Applicant: CANON KABUSHIKI KAISHA, Tokyo (JP)

(72) Inventors: Amit Kumar Gupta, Liberty Grove (AU); Ashley John Partis, Camperdown (AU); David Kenji See, Artarmon (AU); Hiroshi Tojo, Fuchu (JP); Peter Jan Pakulski, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 14/355,193

(22) PCT Filed: Oct. 19, 2012

(86) PCT No.: PCT/IB2012/002274
§ 371 (c)(1),
(2) Date: Apr. 29, 2014

(87) PCT Pub. No.: WO2013/064891
PCT Pub. Date: May 10, 2013

(65) Prior Publication Data
US 2014/0301604 A1    Oct. 9, 2014

(30) Foreign Application Priority Data
Nov. 1, 2011    (AU) ................. 2011244921

(51) Int. Cl.
*H04N 5/243*    (2006.01)
*H04N 5/20*    (2006.01)
*G06T 5/00*    (2006.01)

(52) U.S. Cl.
CPC ............. *H04N 5/243* (2013.01); *G06T 5/009* (2013.01); *H04N 5/20* (2013.01);
(Continued)

(58) Field of Classification Search
CPC ........... G06T 5/009; G06T 2207/10016; G06T 2207/20021; G06T 2207/20052; H04N 5/20; H04N 5/243
See application file for complete search history.

(56) References Cited

U.S. PATENT DOCUMENTS 5,724,456 A * 3/1998 Boyack ................... G06T 5/009
                                                                 345/428
7,424,175 B2   9/2008 Lipton et al.
(Continued)

FOREIGN PATENT DOCUMENTS

WO    2009/026966 A1    3/2009

OTHER PUBLICATIONS

Piccardi M Ed—Liu W T et al, "Background subtraction techniques: a review", 2004 IEEE International Conference on Systems, Man and Cybernetics, IEEE, Piscataway, NJ, USA, vol. 4, Oct. 10, 2004 (Oct. 10, 2004), pp. 3099-3104, XP010773231, ISBN: 978-0-7803-8566-5.

*Primary Examiner* — Kim Vu
*Assistant Examiner* — Pinalben Patel
(74) *Attorney, Agent, or Firm* — Canon U.S.A., INC. IP Division

(57) ABSTRACT

Disclosed are a method and apparatus for adjusting a set of luminance values associated with a set of visual elements in a current frame (310) of a video sequence for object detection (370). The method determines (410,430,450), for each of a plurality of scenarios (S0, S1, S2), a set of adjusted luminance values based on a corresponding luminance compensation value, and accumulates (460), for each scenario, a (Continued)

set of brightness counts and darkness counts of the current frame based on the set of adjusted luminance values. A metric (470) is calculated for each scenario based on the set of brightness counts and darkness counts and one of scenarios is selected based on the calculated metric. The method then selects (350) the adjusted luminance value associated with the selected scenario as an adjusted set of luminance values associated with the current frame of the video sequence.

18 Claims, 13 Drawing Sheets

(52) U.S. Cl.
CPC ............... *G06T 2207/10016* (2013.01); *G06T 2207/20021* (2013.01); *G06T 2207/20052* (2013.01)

(56) References Cited

U.S. PATENT DOCUMENTS

| | | | |
|---|---|---|---|
| 7,916,219 B2 | 3/2011 | Kodavalla | |
| 8,731,322 B2* | 5/2014 | Lee | G06T 5/009 382/167 |
| 2004/0228530 A1 | 11/2004 | Schwartz et al. | |
| 2005/0185045 A1* | 8/2005 | Kamariotis | G06T 7/0081 348/14.12 |
| 2006/0078305 A1* | 4/2006 | Arora | G11B 27/10 386/201 |
| 2008/0018800 A1* | 1/2008 | Kodavalla | H04N 5/202 348/672 |
| 2008/0037868 A1* | 2/2008 | Han | G06T 5/009 382/169 |
| 2008/0074510 A1* | 3/2008 | Chen | H04N 5/2351 348/234 |
| 2008/0122857 A1* | 5/2008 | Hsuan | G06T 5/009 345/589 |
| 2008/0151101 A1* | 6/2008 | Tian | H04N 5/145 348/448 |
| 2009/0153730 A1* | 6/2009 | Knee | G06T 3/0012 348/445 |
| 2009/0284461 A1* | 11/2009 | Hsu | G06T 5/009 345/102 |
| 2009/0310822 A1* | 12/2009 | Chang | G06T 7/0081 382/103 |
| 2011/0150284 A1* | 6/2011 | Son | G06T 7/2026 382/103 |
| 2011/0249890 A1* | 10/2011 | Kim | G06T 5/009 382/162 |
| 2012/0327303 A1* | 12/2012 | Sun | G09G 3/3406 348/687 |
| 2015/0109326 A1* | 4/2015 | Romano | G09G 5/18 345/618 |

* cited by examiner

METHOD AND SYSTEM FOR LUMINANCE ADJUSTMENT OF IMAGES IN AN IMAGE SEQUENCE

CROSS REFERENCE TO RELATED APPLICATIONS

This application is a National Stage filing of International Application No. PCT/IB2012/002274 filed Oct. 19, 2012, which claims the benefit of priority from Australian Patent Application No. 2011244921 filed Nov. 1, 2011, the disclosures of each of which are hereby incorporated by reference herein in their entirety.

TECHNICAL FIELD

The present disclosure relates to video processing and, in particular, to compensation of luminance changes in image sequences.

BACKGROUND

A video is a sequence of images (also referred to as "frames"), that may be encoded and compressed, such as, for example, as motion-JPEG (M-JPEG) or according to the H.264 standard. The terms 'frame' and 'image' are used interchangeably throughout this specification to describe a single image in an image sequence, wherein the image sequence includes one or more images. An image is made up of visual elements, for example pixels or 8×8 DCT (Discrete Cosine Transform) blocks, as used in JPEG images in a motion-JPEG stream.

A global luminance change is a change that affects the visual representation of a large part of a scene captured by an image sensor. The change may arise, for example, from a change in the strength of a lighting source illuminating the scene or a change in one or more settings of the sensor. A global luminance change is often not associated with a change of the semantics of the scene. That is, the visual representation of the scene changes even though the actual scene has not changed. In practice, a luminance change is often limited only to a portion of the image when, because of multiple light sources and/or obstacles, not all parts of the scene are affected equally by the luminance change.

Global luminance changes may be caused by a change in the scene, by a change in the sensor parameters, or by contemporaneous changes in both the scene and the sensor parameters. A change in the scene may occur as a result of a change in lighting, for example. A change in the sensor parameters may occur as a result of changes to camera gain, aperture, focus adjustment, or any combination thereof.

Luminance compensation can be used on image sequences to reduce the effects of global luminance changes on the image sequence. Luminance compensation involves using low frequency luminance components of an image in an image sequence for a particular purpose, for example, to reduce flicker in a sequence of images intended for human visualisation. Thus, luminance compensation can improve the stability of the DC (zero frequency) luminance components of an image, where the image content is unchanged and the DC luminance components of the unchanging image content are modified only due to a change in luminance across the whole scene.

Global luminance changes pose a problem for background modelling and background-differencing techniques, since regions of the image that would have been similar to the background become different from the background model due to the luminance change. The background modelling systems, using background-differencing, are dependent upon the low frequency (close to DC) luminance components of an image. Accordingly, changes to the luminance components across the entire scene, due to changes in lighting or camera settings, can cause false detections of foreground in a scene. Thus, since the differences between block and mode model are high according to their visual representations, regions that are really background (the same as before) are now classified as foreground, due to the difference in their luminance values. For this reason, a background modelling system is more sensitive to long term changes in luminance values across an entire scene than the human vision and the video compression systems. For example, video compression systems are typically more concerned, from the point of view of video coding efficiency, with what looks similar than what is actually similar. That is, if a luminance change is hardly perceptible to a viewer, systems that are concerned with image communication and display have no interest in correcting for the change. For background modelling, however, a small change can translate to big differences during further processing. For example, it can be the difference between classifying foreground/background.

Background modelling systems may incorporate techniques to update a scene model based on the latest observed image. The update techniques allow background modelling systems to cope with structural changes in the scene. For example, a new painting in a museum will initially be detected as a foreground object, but after some time the painting becomes part of the background. The same update techniques allow background modelling systems to deal with lighting changes. Temporarily, the regions affected by luminance changes are considered foreground, but after a while the regions become background again.

One problem with the use of such model updating techniques is that it takes time to adjust to the new situation. For fast changes in luminance, the resulting false detections are undesirable. Another problem is that only the models of modes that are matched are being updated. However, luminance changes can occur when part of the background (represented by a first mode model) is occluded by foreground (represented by a second mode model). When the foreground object moves away and the background region is revealed again, the region should be classified as being similar to the background model, even though the global luminance changes have made the revealed region of the image look different from the background model.

Other luminance compensation approaches calculate the mean luminance value of each image in an image sequence and track the mean luminance value of each image in an image sequence using an exponential moving average. Some approaches prefer tracking the median luminance value, as the median value is less dependent on local changes in the frame.

The approaches which track the mean (or median) value of the image assume that changes in the mean (or median) value of frame are due to global lighting changes. This assumption is not valid in scenarios where a foreground object occludes part of the scene and the foreground object has different luminance characteristics from the occluded region. In such scenarios, these approaches are not sufficiently robust.

Some luminance compensation methods operate on individual images in the image sequence. Such methods may, for example, use histogram-based measures to compensate for luminance changes in an individual image. These methods are very sensitive to noise caused by non-representative frames and temporary changes in the scene that are not caused by lighting.

Some luminance compensation approaches modify the luminance compensation when some measure of the overall luminance of the scene moves beyond a certain range. The range may be either predetermined, or dependent on the previous luminance values in the image sequence.

Thus, for background modelling applications, an accurate luminance compensation method is desired that minimises false foreground detections caused by lighting changes. In addition, for real-time background modelling and background-differencing applications, it is preferable for the utilised luminance compensation method to have high performance and predictable results. For use in embedded systems, or on servers serving a large camera network, a luminance compensation method should have relatively low computational requirements, so that it does not interfere computationally with the actual background modelling and background-differencing process.

Thus, there is a need to provide an improved luminance compensation method and system.

SUMMARY

It is an object of one or more embodiments of the present disclosure to overcome substantially, or at least ameliorate, one or more disadvantages of existing arrangements.

The present disclosure provides a method and apparatus for adjusting a set of luminance values associated with a set of visual elements in a frame of a video sequence. The method utilises a plurality of scenarios and associated luminance compensation values to determine a corresponding plurality of sets of brightness and darkness counts. The method utilises the sets of brightness and darkness counts to select one of the scenarios and utilises adjusted luminance values associated with the selected scenario as an adjusted set of luminance values for the frame.

According to a first aspect of the present disclosure, there is provided a method of adjusting a set of luminance values associated with a set of visual elements in a frame of a video sequence. The method includes the steps of: determining, for each of a plurality of scenarios, a set of adjusted luminance values based on a luminance compensation value associated with that scenario; accumulating a plurality of sets of brightness counts and darkness counts based on a comparison of luminance values of a scene model associated with the frame and each set of adjusted luminance values, each of the sets of brightness count and darkness count being associated with one of the plurality of scenarios; calculating a metric for each of the plurality of scenarios based on a difference between the associated set of brightness count and darkness count and a sum of the associated set of brightness count and darkness count; selecting one of scenarios based on the calculated metrics; and selecting the adjusted luminance values associated with the selected scenario as an adjusted set of luminance values associated with the set of visual elements in the image of the video sequence.

According to a second aspect of the present disclosure, there is provided an apparatus for adjusting a set of luminance values associated with a set of visual elements in a frame of a video sequence. The apparatus includes a storage device for storing a computer program and a processor for executing the program. The program includes code for performing the method steps of: determining a plurality of luminance compensation values, each of the plurality of luminance compensation values being associated with a corresponding one of a plurality of scenarios; determining, for each scenario, a set of adjusted luminance values based on the luminance compensation value associated with that scenario; accumulating a plurality of sets of brightness counts and darkness counts based on a comparison of luminance values of a background model associated with the frame and each set of adjusted luminance values, each of the sets of brightness count and darkness count being associated with one of the plurality of scenarios; calculating a metric for each of the plurality of scenarios based on a difference between the associated set of brightness count and darkness count and a sum of the associated set of brightness count and darkness count; selecting one of scenarios based on the calculated metrics; and selecting the adjusted luminance values associated with the selected scenario as an adjusted set of luminance values associated with the set of visual elements in the image of the video sequence.

In a specific implementation disclosed is a method of adjusting a set of luminance values associated with a set of visual elements in a current frame of a video sequence for object detection. This method comprising determines, for each of a plurality of scenarios, a set of adjusted luminance values based on a corresponding luminance compensation value. The method accumulates, for each scenario, a set of brightness counts and darkness counts of the current frame based on the set of adjusted luminance values, and calculates a metric for each scenario based on the set of brightness counts and darkness counts. The method selects one of scenarios based on the calculated metric, and selects the adjusted luminance value associated with the selected scenario as an adjusted set of luminance values associated with the current frame of the video sequence. Desirably the metric is calculated based on a difference between the associated set of brightness counts and darkness counts and a sum of the associated set of brightness counts and darkness counts. Typically the brightness count is indicative of the number of visual elements that has an adjusted luminance value that is brighter than the luminance value of a scene model or a previous frame and the darkness count is indicative of the number of visual elements that has an adjusted luminance value that is darker than the luminance value of the scene model or the previous frame. Preferably the plurality of scenarios comprise: (i) a scenario where the brightness level of the current frame is substantially the same as the overall brightness level of a previous frame in the video sequence and the compensation value and compensation adjustment value for the previous frame are suitable for the current frame; (ii) a scenario where the brightness level of the current frame is greater than the brightness level of the previous frame in the video sequence and the compensation value and compensation adjustment value for the previous frame are adjusted to the current frame; and (iii) a scenario where the brightness level of the current frame is less than the brightness level of the previous frame in the video sequence, and the compensation value and compensation adjustment value for the previous frame are adjusted to the current frame. The plurality of scenarios may also comprises at least one of: (iv) a scenario where the brightness level of the current frame is greater than the brightness level of the previous frame in the video sequence and the compensation value is adjusted by a constant only; and (v) a scenario where the brightness level of the current frame is lower than the brightness level of the previous frame in the video sequence and the compensation value is adjusted by a constant only. Preferably each visual element in the current frame is associated with a corresponding luminance value. Desirably the set of adjusted luminance values for each scenario is derived from the luminance compensation value associated with that scenario and the corresponding luminance values associated with the visual elements in the current frame. In a particular implementation the method further comprises utilising the adjusted set of luminance values to perform foreground/background object detection on the current frame.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the present disclosure are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Figure 1:
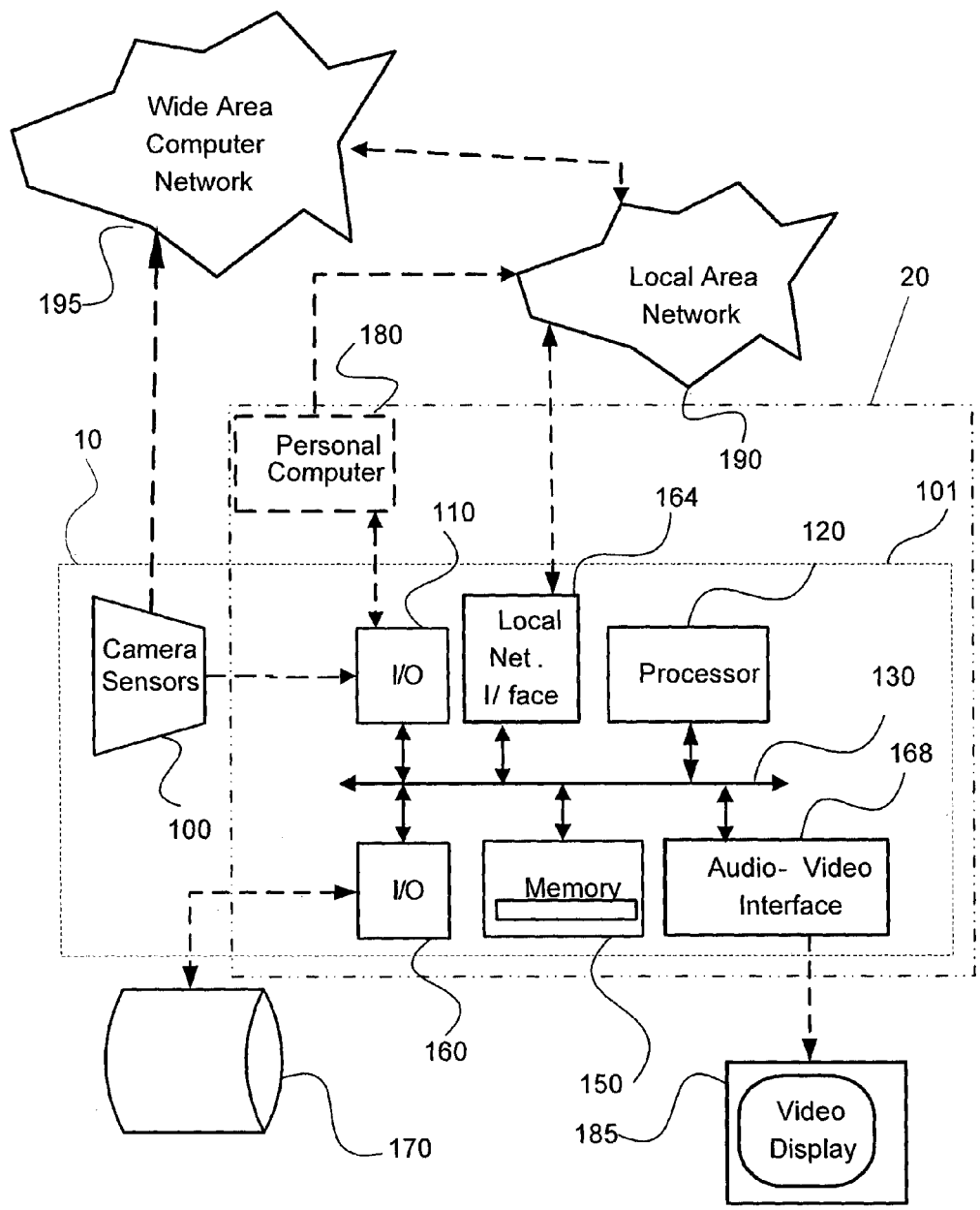
FIG. 1 shows a network camera for implementing the global luminance adjustment method.

Where reference is made in any one or more of the accompanying drawings to steps and/or features that have the same reference numerals, those steps and/or features have for the purposes of this description the same function(s) or operation(s), unless the contrary intention appears.

Background modelling involves the modelling of the visual content of a scene, based on an image sequence depicting the scene. Background modelling allows a video analysis system to distinguish between transient foreground objects and the non-transient background, through a background-differencing operation.

In one example, including a camera with a fixed field of view, the background model is derived from the first frame of an image sequence, based on the assumption that the first frame is known to contain non-transient content only. Background-differencing is then performed by subtracting a later frame in the image sequence from the background model to classify portions of the scene as foreground or background. Regions of the later image that are different from the background model are classified as foreground and regions of the later image that are similar to the background model are classified as background. The definitions of "different" and "similar" depend upon the background modelling method being used.

In another example of a background model, the frames depicting a scene comprise visual elements in the form of 8×8 DCT (Discrete Cosine Transform) blocks associated with each position in the scene. For each position, several mode models are maintained. The mode models relate to different visual content of the 8×8 blocks encountered at the same scene position, but at different points in the image sequence. Thus, the mode models associated with a position in the scene represent the different visual content that has appeared at that position at different times in the image sequence. If a block in a new incoming frame is similar to an existing mode model, the existing mode model is updated. Updating a mode model may include, for example, increasing a count of the number of times that mode model has been matched, or recording the time or frame number of the latest match. If the block in a new incoming frame is different from all existing mode models for the scene position, a new mode model is created and initialized with the values of the block in the new incoming frame.

By keeping track of the temporal characteristics of a mode model and a count of the update frequency of the mode model, a decision can be made as to whether a mode model represents foreground or background. For example, if the time that has passed since the mode model was created is longer than a predetermined threshold value, the mode model may be classified as background. Otherwise, the mode model is classified as foreground. In another example, a mode model is classified as background if the mode model was updated more times than a threshold value. If this is not the case, the mode model is classified as foreground.

The comparison between a visual element (such as a pixel or DCT block) and a mode model is based on similarity, rather than an exact match. The reason is that the captured representation of the real world varies even when the real world is constant. In addition, there can be small variations in the visual appearance of the real world while there is no semantic change in the scene. For example, a change in lighting changes the visual appearance of objects captured by a sensor. An example of background-differencing using a block/mode model similarity comparison method is the calculation of the weighted sum of the differences between modelled DCT coefficients and DCT coefficients of the block. The weighted sum is then compared to a threshold to determine whether the modelled DCT coefficients are sufficiently similar to the DCT coefficients of the block or not.

The present disclosure provides a global luminance adjustment method that utilises a plurality of scenarios and corresponding luminance compensation values to select an adjusted set of luminance values for a video frame in a video sequence. In particular, the method adjusts a set of luminance values associated with a set of visual elements in a frame of a video sequence. The method determines a plurality of luminance compensation values, each of the plurality of luminance compensation values being associated with a corresponding one of a plurality of scenarios. For each scenario, the method determines a set of adjusted luminance values based on the luminance compensation value associated with that scenario. The method accumulates a plurality of sets of brightness counts and darkness counts based on a comparison of luminance values of a background model associated with the frame that is being processed and each set of adjusted luminance values. Each set of brightness count and darkness count is associated with one of the plurality of scenarios.

The method selects one of the scenarios, based on a calculated metric. In one embodiment, the method calculates a metric for each of the plurality of scenarios based on a difference between the associated set of brightness count and darkness count and a sum of the associated set of brightness count and darkness count. The method then selects the adjusted luminance values associated with the selected scenario as an adjusted set of luminance values associated with the set of visual elements in the image of the video sequence.

FIG. 1 shows a network camera 101 for implementing a global luminance adjustment method in accordance with the present disclosure. One or more sensors 100 are used to obtain images of an image sequence. The sensors 100 may include or be associated with a lens system for focussing on a scene captured by the video sequence. The network camera 101 also includes a processor 120, a memory 150, an audio-video (AV) interface 168, input/output interfaces 110, 160, and a local network interface 164. As illustrated a video display 185 and a storage device 170 couple to the network camera 101 via the interfaces 168 and 160 respectively.

The sensors 100 may represent a stand-alone sensor device, such as a detector or a security camera, or be part of an imaging device, such as camera or mobile phone. The remaining electronic elements 110 to 168 may also be part of the imaging device comprising camera sensors 100, as indicated by dotted line 10. The electronic elements 110 to 168 may also be part of a computer system that is located either locally or remotely with respect to the sensors 100. In the case indicated by dotted line 20, electronic elements form a part of personal computer 180.

The transmission of the images from the camera sensors 100 to the processing electronics 120 to 168 is facilitated by an input/output interface 110, which could be a serial bus compliant with Universal Serial Bus (USB) standards and having corresponding USB connectors. Alternatively, the image sequence may be retrieved from camera sensors 100 via a Local Area Network 190 or a Wide Area Network 195. The image sequence may also be downloaded from a local storage device 170, which may be implemented, for example, as a SIM card or SD card.

In one example, images captured by the sensors 100 are received by the input/output interface 110 and sent via a system bus 130 to the memory 150 or another of the processing elements 120 to 168. The processor 120 is arranged to retrieve the luminance data of the sequence of images from sensors 100 or from memory 150. The processor 120 is also arranged to fetch, decode, and execute all steps of the disclosed method. The processor 120 then records the results from the respective operations to memory 150, again using system bus 130. Apart from memory 150, the output could also be stored more permanently on a storage device 170, via an input/output interface 160. The same output may also be sent, as an alternative to or in combination with the above-mentioned storage options, via network interface 164, either to a remote server which may be part of the network 190 or 195, or to personal computer 180, using input/output interface 110. The output may also be displayed for human viewing, using AV interface 168, on a video display (monitor) 185. Alternatively, the output may be processed further. One example of further processing may include using the output data, written back to memory 150, memory 170 or computer 180, as the input to a background modelling system.

As described above and indicated in FIG. 1, the above method may be embodied in various forms. In the particular form indicated by rectangle 10 in FIG. 1, the method is implemented in an imaging device, such as a camera or a mobile phone with a camera. In this case, all the processing electronics 110 to 168 form part of the imaging device, as indicated by rectangle 10. As mentioned above, such an imaging device for capturing a sequence of images and adjusting the luminance values of the visual elements in at least some of the captured images comprises: a sensor. 100, memory 150, a processor 120, an input/output interface 110, and a system bus 130. The sensor 100 is arranged for capturing data of the luminance values of a plurality of visual elements of each image in a sequence of images. The memory 150 is used for storing the luminance values of each image in the sequence of images captured by the sensor and previously determined previous luminance compensation value, previous compensation adjustment value and previous luminance compensation direction. The processor 120 is arranged for receiving, from the sensor 100 or from the memory 150, the stored luminance values of each image in the sequence of images and the stored previous luminance compensation value, previous compensation adjustment value and previous luminance compensation direction. The processor 120 hypothesizes a number of possible luminance compensation scenarios and computes a brightness count and a darkness count for each of the hypothesized scenarios. The brightness count is indicative of the number of visual elements that have an adjusted luminance value that is brighter than the luminance value of a scene model or a previous frame. The darkness count is indicative of the number of visual elements that have an adjusted luminance value that is darker than the luminance value of the scene model or the previous frame. The processor 120 does that by performing a comparison of the luminance value of a visual element in the input image and a visual element in the scene model in the corresponding location.

Further, the processor 120 is arranged for determining the current luminance compensation direction based on a cost function, which determines a lowest cost of all the hypothesized scenarios. Based on the result of such a cost function, a winning scenario is selected; hence for the current frame, the final compensation direction, compensation adjustment value and luminance compensation value are chosen. Next, the processor applies the determined final luminance compensation value to the luminance value of each block in the current input frame. The input/output interface 110 facilitates the transmitting of the luminance data from the sensor 100 to the memory 150 and to the processor 120, while the system bus 130 transmits data between the input/output interface 110 and the processor 120.

Advances in network camera design have provided technology for video analytics to be performed on the camera itself using processor 105 and memory 106. Such video analytics may include, for example, video object detection. Alternatively, video analytics may be performed on a computer system or a combination of a computer system and a network camera.

Figure 11A:
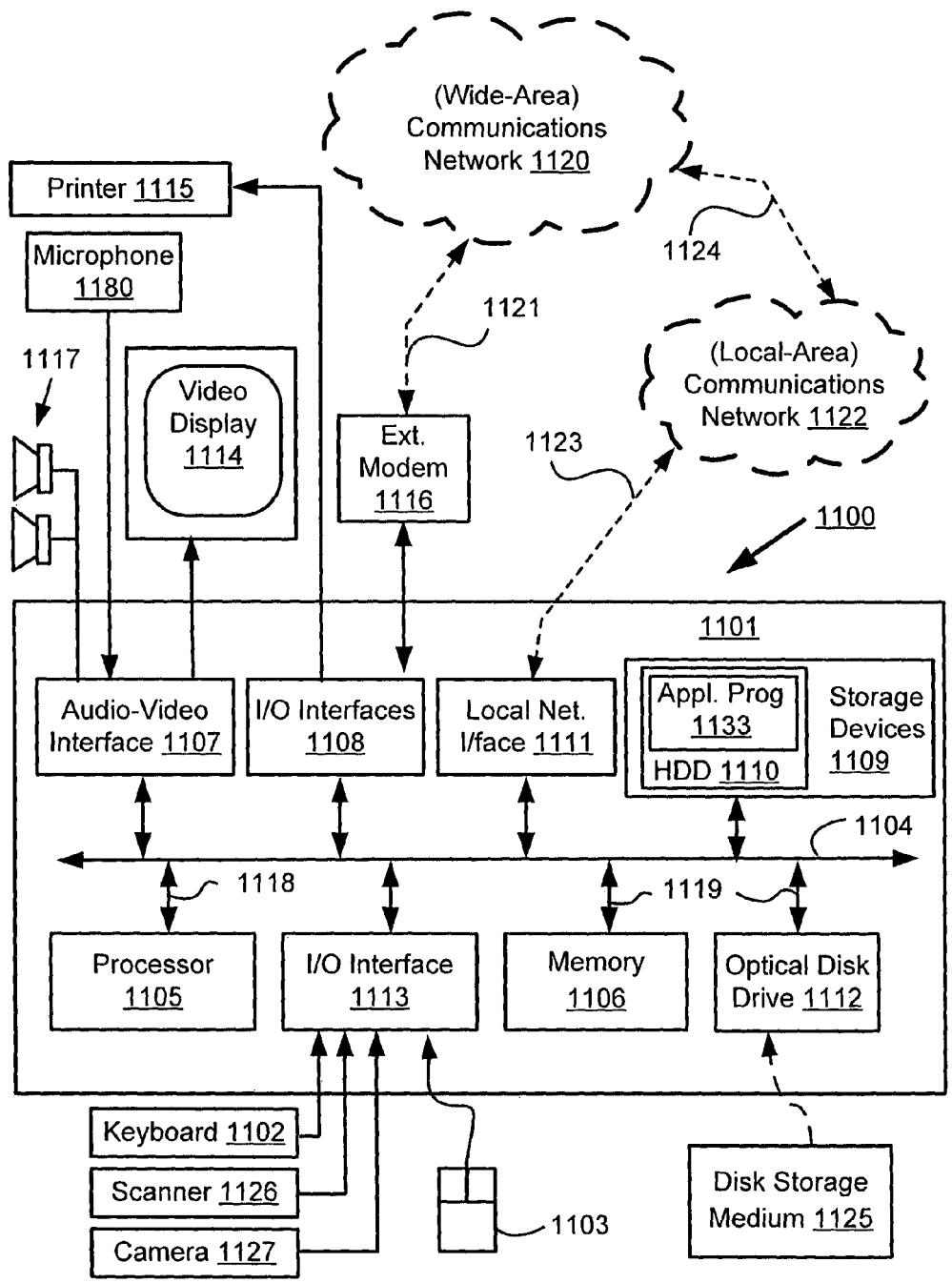
FIGS. 11A and 11B form a schematic block diagram of a general purpose computer system upon which arrangements described can be practiced.
Figure 11B:
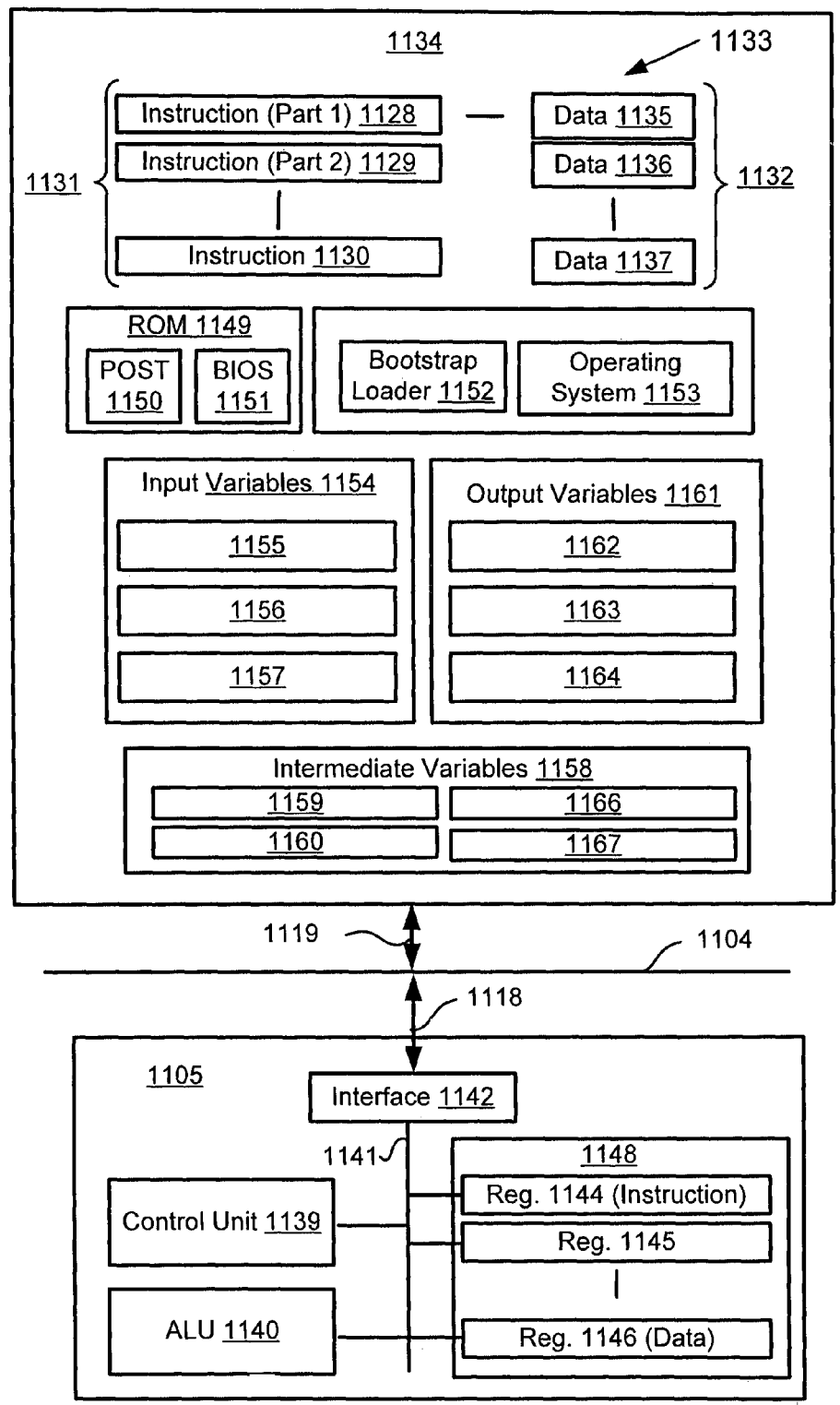

FIGS. 11A and 11B depict a general-purpose computer system 1100, upon which the various arrangements described can be practiced. In one embodiment, the computer system 1100 forms part of an image processing system that is utilised to process an image of a video sequence captured by the network camera 101.

As seen in FIG. 11A, the computer system 1100 includes: a computer module 1101; input devices such as a keyboard 1102, a mouse pointer device 1103, a scanner 1126, a camera 1127, and a microphone 1180; and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The communications network 1120 may be a wide-area network (WAN), such as the Internet, a cellular telecommunications network, or a private WAN. Where the connection 1121 is a telephone line, the modem 1116 may be a traditional "dial-up" modem. Alternatively, where the connection 1121 is a high capacity (e.g., cable) connection, the modem 1116 may be a broadband modem. A wireless modem may also be used for wireless connection to the communications network 1120.

The computer module 1101 typically includes at least one processor unit 1105, and a memory unit 1106. For example, the memory unit 1106 may have semiconductor random access memory (RAM) and semiconductor read only memory (ROM). The computer module 1101 also includes an number of input/output (I/O) interfaces including: an audio-video interface 1107 that couples to the video display 1114, loudspeakers 1117 and microphone 1180; an I/O interface 1113 that couples to the keyboard 1102, mouse 1103, scanner 1126, camera 1127 and optionally a joystick or other human interface device (not illustrated); and an interface 1108 for the external modem 1116 and printer 1115. In some implementations, the modem 1116 may be incorporated within the computer module 1101, for example within the interface 1108. The computer module 1101 also has a local network interface 1111, which permits coupling of the computer system 1100 via a connection 1123 to a local-area communications network 1122, known as a Local Area Network (LAN). As illustrated in FIG. 11A, the local communications network 1122 may also couple to the wide network 1120 via a connection 1124, which would typically include a so-called "firewall" device or device of similar functionality. The local network interface 1111 may comprise an Ethernet™ circuit card, a Bluetooth™ wireless arrangement or an IEEE 802.11 wireless arrangement; however, numerous other types of interfaces may be practiced for the interface 1111.

The I/O interfaces 1108 and 1113 may afford either or both of serial and parallel connectivity, the former typically being implemented according to the Universal Serial Bus (USB) standards and having corresponding USB connectors (not illustrated). Storage devices 1109 are provided and typically include a hard disk drive (HDD) 1110. Other storage devices such as a floppy disk drive and a magnetic tape drive (not illustrated) may also be used. An optical disk drive 1112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1100.

The components 1105 to 1113 of the computer module 1101 typically communicate via an interconnected bus 1104 and in a manner that results in a conventional mode of operation of the computer system 1100 known to those in the relevant art. For example, the processor 1105 is coupled to the system bus 1104 using a connection 1118. Likewise, the memory 1106 and optical disk drive 1112 are coupled to the system bus 1104 by connections 1119. Examples of computers on which the described arrangements can be practiced include IBM-PCs and compatibles, Sun Sparcstations, Apple Mac™, or alike computer systems.

The method of adjusting a set of luminance values may be implemented using the computer system 1100 wherein the processes of FIGS. 2 to 10, to be described, may be implemented as one or more software application programs 1133 executable within the computer system 1100. In particular, the steps of the method of adjusting a set of luminance values are effected by instructions 1131 (see FIG. 11B) in the software 1133 that are carried out within the computer system 1100. The software instructions 1131 may be formed as one or more code modules, each for performing one or more particular tasks. The software may also be divided into two separate parts, in which a first part and the corresponding code modules performs the luminance compensation methods and a second part and the corresponding code modules manage a user interface between the first part and the user.

The software may be stored in a computer readable medium, including the storage devices described below, for example. The software is loaded into the computer system 1100 from the computer readable medium, and then executed by the computer system 1100. A computer readable medium having such software or computer program recorded on the computer readable medium is a computer program product. The use of the computer program product in the computer system 1100 preferably effects an advantageous apparatus for image processing, particularly with respect to adjusting luminance values to assist in performing object detection.

The software 1133 is typically stored in the HDD 1110 or the memory 1106. The software is loaded into the computer system 1100 from a computer readable medium, and executed by the computer system 1100. Thus, for example, the software 1133 may be stored on an optically readable disk storage medium (e.g., CD-ROM) 1125 that is read by the optical disk drive 1112. A computer readable medium having such software or computer program recorded on it is a computer program product. The use of the computer program product in the computer system 1100 preferably effects an apparatus for advantageous apparatus for image processing, particularly with respect to adjusting luminance values to assist in performing object detection.

In some instances, the application programs 1133 may be supplied to the user encoded on one or more CD-ROMs 1125 and read via the corresponding drive 1112, or alternatively may be read by the user from the networks 1120 or 1122. Still further, the software can also be loaded into the computer system 1100 from other computer readable media. Computer readable storage media refers to any non-transitory tangible storage medium that provides recorded instructions and/or data to the computer system 1100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1101. Examples of transitory or non-tangible computer readable transmission media that may also participate in the provision of software, application programs, instructions and/or data to the computer module 1101 include radio or infra-red transmission channels as well as a network connection to another computer or networked device, and the Internet or Intranets including e-mail transmissions and information recorded on Websites and the like.

The second part of the application programs 1133 and the corresponding code modules mentioned above may be executed to implement one or more graphical user interfaces (GUIs) to be rendered or otherwise represented upon the display 1114. Through manipulation of typically the keyboard 1102 and the mouse 1103, a user of the computer system 1100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1117 and user voice commands input via the microphone 1180.

FIG. 11B is a detailed schematic block diagram of the processor 1105 and a "memory" 1134. The memory 1134 represents a logical aggregation of all the memory modules (including the HDD 1109 and semiconductor memory 1106) that can be accessed by the computer module 1101 in FIG. 11A.

When the computer module 1101 is initially powered up, a power-on self-test POST) program 1150 executes. The POST program 1150 is typically stored in a ROM 1149 of the semiconductor memory 1106 of FIG. 11A. A hardware device such as the ROM 1149 storing software is sometimes referred to as firmware. The POST program 1150 examines hardware within the computer module 1101 to ensure proper functioning and typically checks the processor 1105, the memory 1134 (1109, 1106), and a basic input-output systems software (BIOS) module 1151, also typically stored in the ROM 1149, for correct operation. Once the POST program 1150 has run successfully, the BIOS 1151 activates the hard disk drive 1110 of FIG. 11A. Activation of the hard disk drive 1110 causes a bootstrap loader program 1152 that is resident on the hard disk drive 1110 to execute via the processor 1105. This loads an operating system 1153 into the RAM memory 1106, upon which the operating system 1153 commences operation. The operating system 1153 is a system level application, executable by the processor 1105, to fulfil various high level functions, including processor management, memory management, device management, storage management, software application interface, and generic user interface.

The operating system 1153 manages the memory 1134 (1109, 1106) to ensure that each process or application running on the computer module 1101 has sufficient memory in which to execute without colliding with memory allocated to another process. Furthermore, the different types of memory available in the system 1100 of FIG. 11A must be used properly so that each process can run effectively. Accordingly, the aggregated memory 1134 is not intended to illustrate how particular segments of memory are allocated (unless otherwise stated), but rather to provide a general view of the memory accessible by the computer system 1100 and how such is used.

As shown in FIG. 11B, the processor 1105 includes a number of functional modules including a control unit 1139, an arithmetic logic unit (ALU) 1140, and a local or internal memory 1148, sometimes called a cache memory. The cache memory 1148 typically include a number of storage registers 1144-1146 in a register section. One or more internal busses 1141 functionally interconnect these functional modules. The processor 1105 typically also has one or more interfaces 1142 for communicating with external devices via the system bus 1104, using a connection 1118. The memory 1134 is coupled to the bus 1104 using a connection 1119.

The application program 1133 includes a sequence of instructions 1131 that may include conditional branch and loop instructions. The program 1133 may also include data 1132 which is used in execution of the program 1133. The instructions 1131 and the data 1132 are stored in memory locations 1128, 1129, 1130 and 1135, 1136, 1137, respectively. Depending upon the relative size of the instructions 1131 and the memory locations 1128-1130, a particular instruction may be stored in a single memory location as depicted by the instruction shown in the memory location 1130. Alternately, an instruction may be segmented into a number of parts each of which is stored in a separate memory location, as depicted by the instruction segments shown in the memory locations 1128 and 1129.

In general, the processor 1105 is given a set of instructions which are executed therein. The processor 1105 waits for a subsequent input, to which the processor 1105 reacts to by executing another set of instructions. Each input may be provided from one or more of a number of sources, including data generated by one or more of the input devices 1102, 1103, data received from an external source across one of the networks 1120, 1102, data retrieved from one of the storage devices 1106, 1109 or data retrieved from a storage medium 1125 inserted into, the corresponding reader 1112, all depicted in FIG. 11A. The execution of a set of the instructions may in some cases result in output of data. Execution may also involve storing data or variables to the memory 1134.

The disclosed luminance value adjustment arrangements use input variables 1154, which are stored in the memory 1134 in corresponding memory locations 1155, 1156, 1157. The luminance value adjustment arrangements produce output variables 1161, which are stored in the memory 1134 in corresponding memory locations 1162, 1163, 1164. Intermediate variables 1158 may be stored in memory locations 1159, 1160, 1166 and 1167.

Referring to the processor 1105 of FIG. 11B, the registers 1144, 1145, 1146, the arithmetic logic unit (ALU) 1140, and the control unit 1139 work together to perform sequences of micro-operations needed to perform "fetch, decode, and execute" cycles for every instruction in the instruction set making up the program 1133. Each fetch, decode, and execute cycle comprises:

(a) a fetch operation, which fetches or reads an instruction 1131 from a memory location 1128, 1129, 1130;

(b) a decode operation in which the control unit 1139 determines which instruction has been fetched; and (c) an execute operation in which the control unit 1139 and/or the ALU 1140 execute the instruction.

Thereafter, a further fetch, decode, and execute cycle for the next instruction may be executed. Similarly, a store cycle may be performed by which the control unit 1139 stores or writes a value to a memory location 1132.

Each step or sub-process in the processes of FIGS. 2 to 10 is associated with one or more segments of the program 1133 and is performed by the register section 1144, 1145, 1147, the ALU 1140, and the control unit 1139 in the processor 1105 working together to perform the fetch, decode, and execute cycles for every instruction in the instruction set for the noted segments of the program 1133.

The method of adjusting a set of luminance values may alternatively be implemented in dedicated hardware such as one or more integrated circuits performing the functions or sub functions of determining luminance compensation values, determining adjusted luminance values, accumulating sets of brightness and darkness counts, calculating metrics for the scenarios, selecting a scenario, and selecting adjusted luminance values associated with the selected scenario. Such dedicated hardware may include graphic processors, digital signal processors, or one or more microprocessors and associated memories.

Figure 2A:
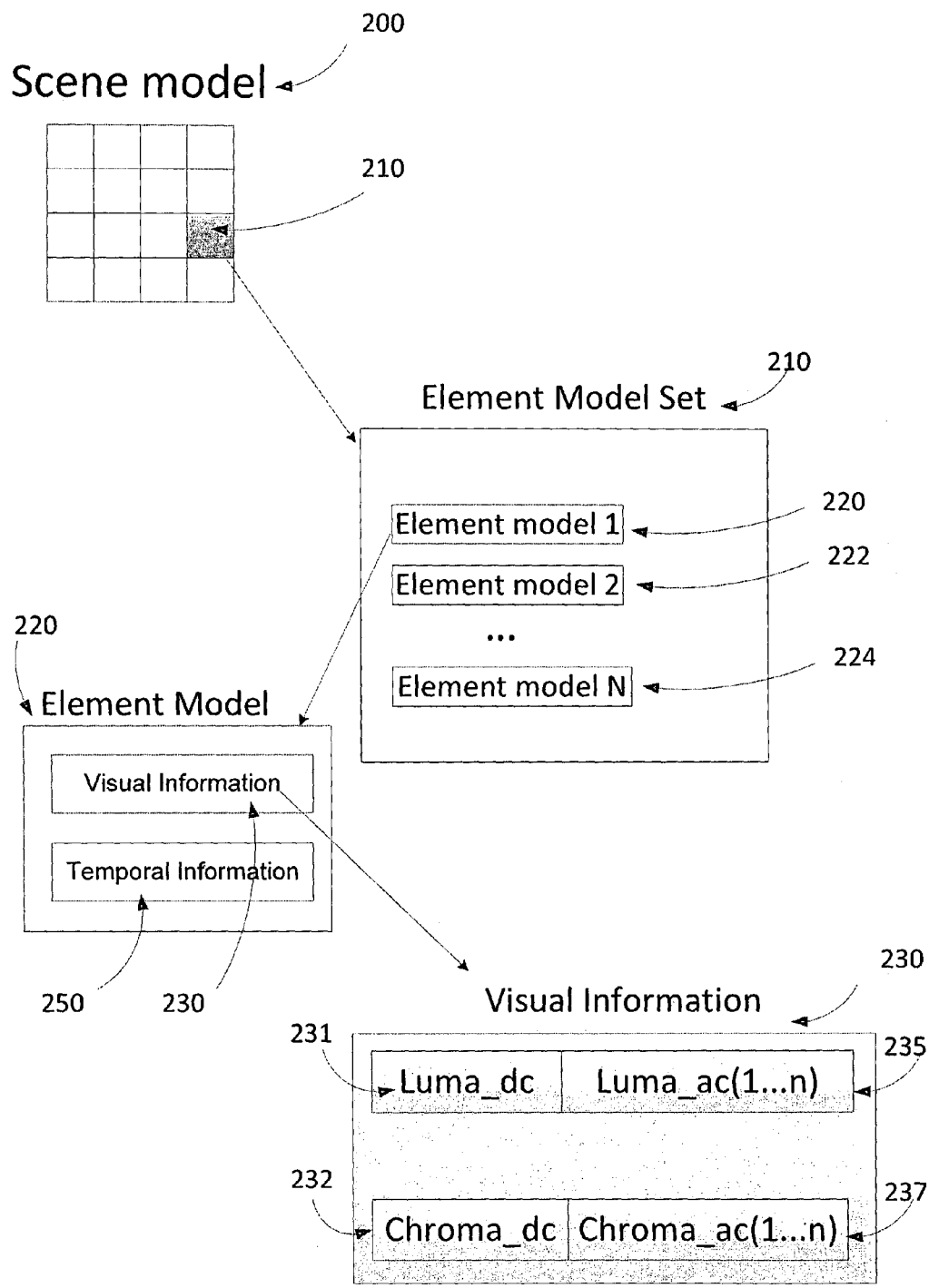
FIG. 2A is a block diagram of a scene model consisting of local element models.

FIG. 2A is a schematic representation of a scene model 200 that includes an element model set 210 for each visual element position in the image corresponding to an 8×8 DCT block. Each element model set 210 includes a plurality of element models (block modes). In one arrangement, the scene model 230 is stored in the memory 150 of the camera 101. In one arrangement, the processing takes place on the processor 120 of the camera 101. In another arrangement, the scene model 230 is stored in memory unit 1106 of the computer module 1101 and processing is performed by the processor unit 1105.

There can be several element models corresponding to the same location in a captured input frame. Each element model is based on a history of values for the corresponding visual element. The element model set 210 includes a set of element models that includes element model 1 220, element model 2 222, . . . , element model N 224.

Each element model corresponds to a different state or appearance of a corresponding visual element. For example, if there is a flashing neon light, element model 1 220 represents "background—light on", element model 2 222 represents "background—light off", and element model N 224 represents "foreground", such as part of a passing car. In one arrangement, the element model is the mean value of pixel intensity values. In another arrangement, the element model is the median or the approximated median of observed DCT coefficient values for each DCT coefficient, and the element model records temporal characteristics.

An element model includes visual information as well as temporal information. Temporal information is information such as creation time, deletion time (the time or frame at which the mode will be deleted if it is not matched anymore), last match time, and hit count. Visual Information includes two sets of values: Luminance (luma) values and Chrominance (chroma) values. In the example of FIG. 2A, the element model 220 includes visual information 230 and temporal information 250. The visual information 230 includes luma values and chroma values. The luma values include luma_dc value 231, and luma_ac values 235. The chroma values include chroma_dc value 232 and chroma ac values 237. The scene model 200 is stored in memory 106.

Figure 2B:
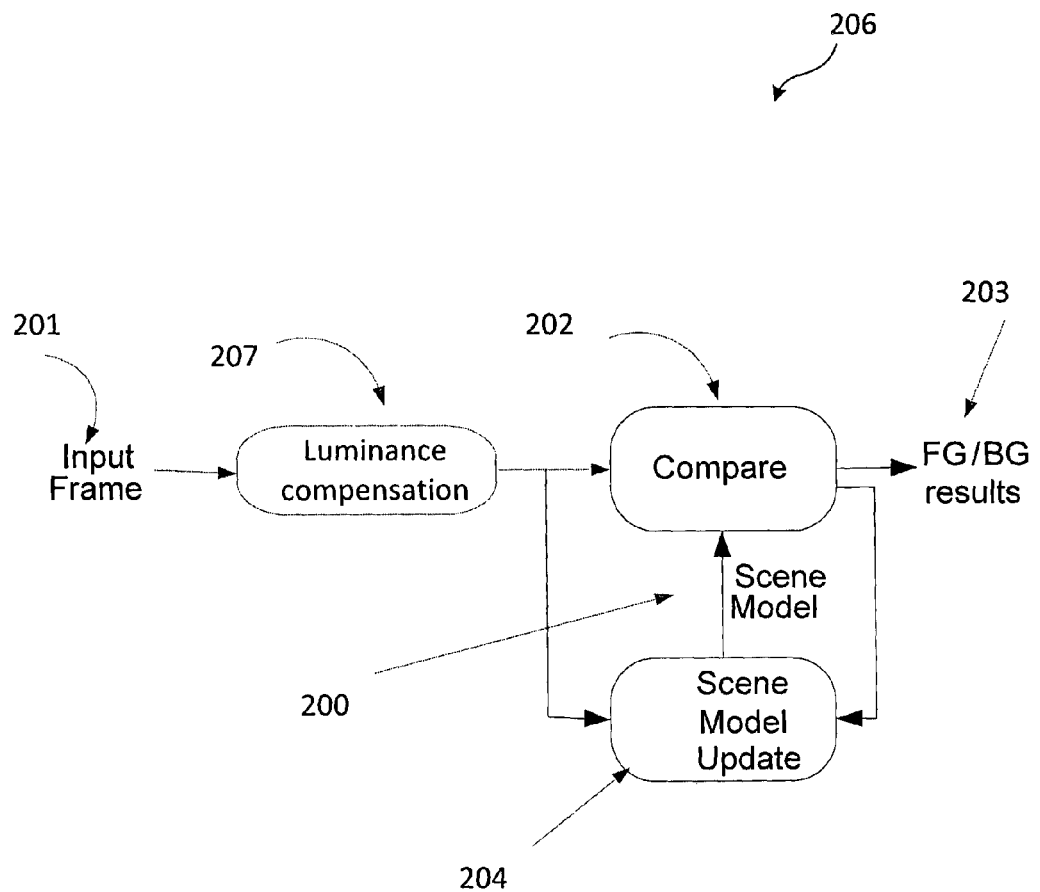
FIG. 2B is a flow diagram illustrating a scene model updating algorithm using the scene model of FIG. 2A.

FIG. 2B is a flow diagram 206 illustrating functionality for performing object detection using the scene model 200. An input frame 201 captured by a sensor 100 is presented to a luminance compensation module 207. For object detection, the luminance value of each block in the input image 201 is first adjusted in a luminance compensation module 207. Then, a comparison module 202 utilises the adjusted image and the current scene model to compare each block within the adjusted input image 201 to all of the stored element models (block modes) for the corresponding visual element. If an existing element model 220 in an element model set 210 for the current block is found to be a match, the scene model update module 204 updates the matched element model. In the update process, both visual information 230 and temporal information 250 are modified. In one arrangement, the visual information 230 is updated with a learning rate threshold $LR_{max}$ using the approximated median filter method. $LR_{max}$ represents the maximum change allowed to the visual information 230 per update. In the same arrangement, the temporal information 250 is updated using the current state of the temporal data, and the current time. More specifically, the match count of the element model is incremented with one hit, to accumulate the match counts, until a maximum match count, say 1000 hits, is reached. The deletion time for the element model is increased by a number of frames, say 500 frames. The last match time for the element model is set to the current time.

If no matching element model (block mode) is found in the comparison module 202, then a new element model (block mode) is created by the scene model update module 204. If a new element model (block mode) is created, or a matched element model (block mode) was created at a time within a set period of current time, then the block in the input image is considered to be foreground. A matched element model (block mode) that is older than said set period of time is considered to be background. The foreground blocks are connected by using a flood-fill algorithm to output foreground objects as a mask 203. The detected foreground regions are further processed depending on the intended application of the network camera. For example, in video surveillance an alarm is raised if a foreground region is detected in a predefined area within the frame. The presence of such a foreground region in a predefined area of the frame may indicate the presence of an unauthorised person, for example.

Figure 3:
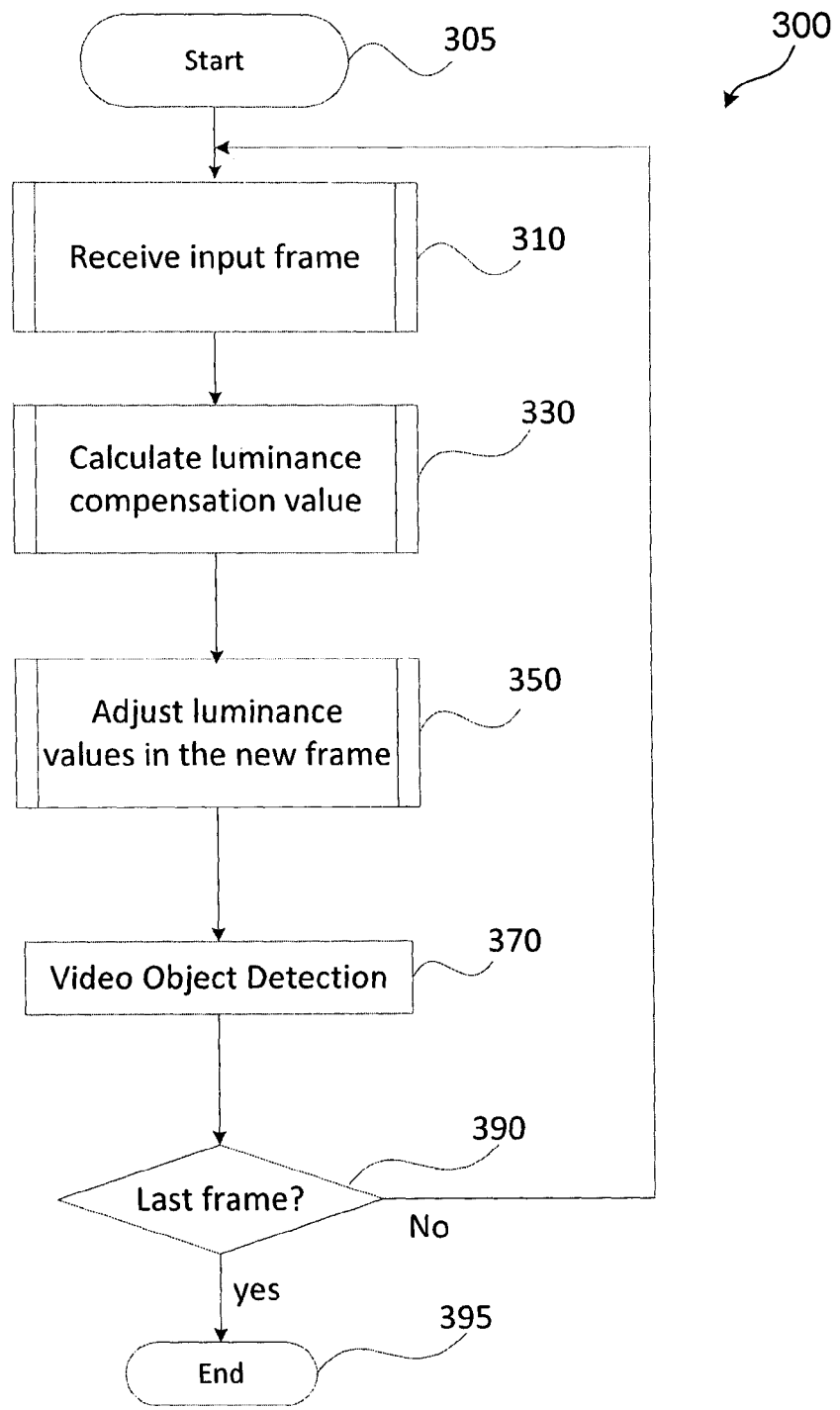
FIG. 3 is a flowchart of the luminance adjustment method in a video object detection process.

FIG. 3 is a flowchart of a luminance adjustment method 300 in a video object detection process, and will be described with reference to FIG. 1. In one embodiment, the method 300 is implemented as one or more code modules of firmware residing within the memory 150 of the camera system 101, wherein execution of the firmware is controlled by the processor 120. The method 300 commences at a Begin step 305 and in step 310 the video object detection system 300 receives a newly captured video frame. The new frame is captured by a network camera 101 via the camera sensor 100. The frame is then optionally compressed in JPEG format by the processor 120. The frame includes a plurality of visual elements. A visual elements may be, for example, a pixel, a group of pixels, or a block of transform coefficients, such as a DCT block.

Then, calculating step 330 computes a Luminance Compensation Value (LCV) and a Compensation Adjustment Value (CAV) for the purpose of finding the direction of lighting change, as well as the amount of luminance compensation. The direction of lighting change indicates whether the scene in the newly captured video frame is brighter or darker, relative to a previous frame or scene model. LCV is a value that is used uniformly to adjust each DCT block in the input image to achieve the effect of global luminance change. CAV is a value which dictates how fast the value of LCV grows or shrinks. In the exemplary embodiment, the values of LCV and CAV are initialized to zero for the first frame.

Control passes from step 330 to step 350, which adjusts the luminance values in the new frame that is being processed, based on the luminance compensation values computed in step 330. Control passes from step 350 to a video detection step 370, which performs detection of foreground objects in the input frame.

Control passes from step 370 to a decision step 390, which determines whether there are more frames that need to be processed, by checking whether the current input frame is the last frame. If there are more frames to be processed and the current input frame is not the last frame, No, the process returns to step 310 to process a next input frame.

Otherwise, if at step 390 the current input frame is the last frame, Yes, control passes to step 395 and the method 300 terminates.

Figure 4:
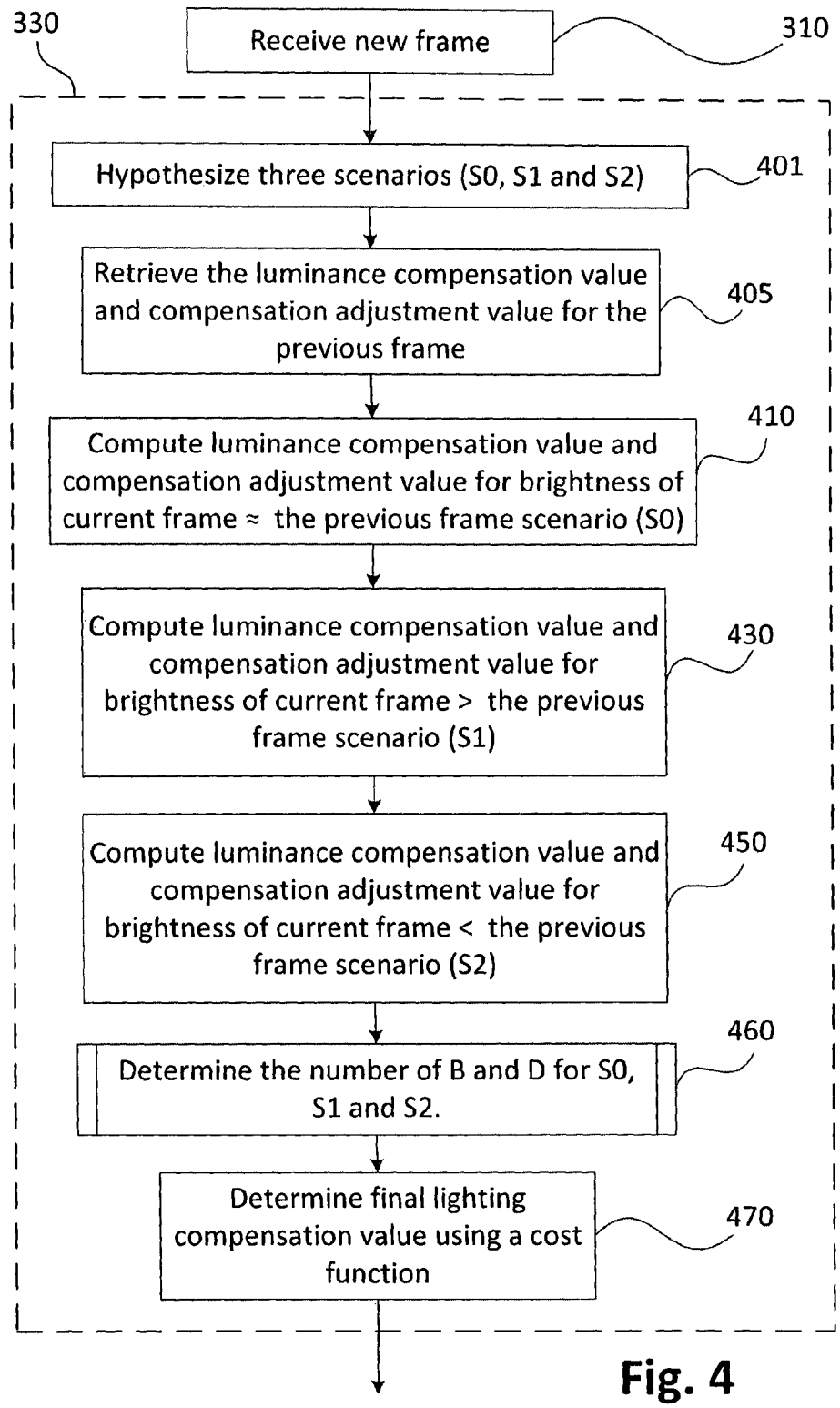
FIG. 4 is a flowchart of a process for calculating the luminance compensation value for current frame.

FIG. 4 is a flow diagram illustrating an exemplary embodiment of performing step 330 to calculate a luminance compensation value. As described above, the input to step 330 is a new frame that was received in step 310 and passed to step 330. In the embodiment of FIG. 4, step 330 begins with a set up assumption step 401, in which three scenarios are hypothesized. First, the amount of LCV and CAV in each of the scenarios are calculated, and denoted $LCV_S$ and $CAV_S$, for a given scenario S. The first scenario, termed S0, is a scenario where the brightness level of the current video frame is substantially the same as the overall brightness level of the previous frame in the image sequence. The brightness level is based on the luminance values of visual elements in the current video frame and the compensation value and compensation adjustment value for the previous frame are suitable for the current frame. The second scenario, called S1, is a scenario where the brightness level of the current video frame is greater than the brightness level of the previous frame in the image sequence and the compensation value and compensation adjustment value for the previous frame are adjusted to the current frame. The last scenario, called S2, is a scenario where the brightness level of the current video frame is less than the brightness level of the previous frame in the image sequence.

The LCV and CAV for each of the three scenarios are denoted $LCV_{S0}$ and $CAV_{S0}$, $LCV_{S1}$ and $CAV_{S1}$, $LCV_{S2}$ and $CAV_{S2}$, respectively. Step 401 also computes the number of visual elements in the current frame that are brighter compared to the matched element model sets 210 in the scene model 200 for each of the scenarios, and formulates a cost function that is used to determine, for the current frame, the final $LCV_F$, $CAV_F$, and the lighting correction scenario. Finally, the $LCV_F$, $CAV_F$ and the lighting correction scenario are stored in memory 150.

Control passes from step 401 to a retrieving step 405, which retrieves from memory 150 the values of $LCV_F^{k-1}$ and $CAV_F^{k-1}$ for initialization of $LCV_s$ and $CAV_s$ of the three scenarios. Assuming the current frame number is k and the previous frame number is k−1, then $LCV_F^{k-1}$ and $CAV_F^{k-1}$ represent the $LCV_s$ and $CAV_s$ corresponding to the winning scenario from the previous frame k−1.

Then in a computing step 410, $LCV_{S0}$ and $CAV_{S0}$ are initialized in accordance with the following equation for the scenario S0.

$$CAV_{S0} = CAV_F^{k-1}$$
$$LCV_{S0} = LCV_F^{k-1} \qquad \text{Eqn (1)}$$

According to Eqn (1), the values $LCV_{S0}$ and $CAV_{S0}$ are directly initialized to the values $LCV_F$ and $CAV_F$. This is because in scenario S0 it is assumed that the luminance compensation value and compensation adjustment value which are used for the previous frame are suitable to use for the current frame.

Next, a computing step 430 calculates values of $LCV_{S1}$ and $CAV_{S1}$ using the following equation for the scenario S1.

$$\Delta t_1 = -CAV_F - \text{const\_update\_value}$$
$$\Delta t_2 = CAV_F + \text{const\_update\_value}$$

$$CAV_{S1} = \begin{cases} \Delta t_1 & \text{if}(CAV_F < 0 \text{ AND } \Delta t_1 \geq \text{const\_update\_value}) \\ \text{const\_update\_value} & \text{if}(CAV_F < 0 \text{ AND } \Delta t_1 < \text{const\_update\_value}) \\ \Delta t_2 & \text{if}(CAV_F >= 0 \text{ AND } CAV_F < \text{max\_update\_value}) \\ CAV_F & \text{if}(CAV_F > 0 \text{ AND } CAV_F \geq \text{max\_update\_value}) \end{cases} \qquad \text{Eqn (2)}$$

$$LCV_{S1} = LCV_F + CAV_{S1}$$

The const_update_value and max_update_value in Eqn (2) are constant values externally set by a user and max_update_value must be greater than zero. A typical example of the values for const_update_value and max_update_value are, say 20 and 1 DCT coefficient. According to Eqn (2), if $CAV_F < 0$, then $CAV_{S1} = -CAV_F - \text{const\_update\_value}$ and $CAV_{S1}$ is capped by const_update_value. If $CAV_F \geq 0$, then the value of $CAV_{S1}$ is $CAV_{S1} = CAV_F + \text{const\_update\_value}$ and $CAV_{S1}$ is capped by max_update_value. Finally, $LCV_{S1}$ is calculated with $LCV_F + CAV_{S1}$.

In an alternative embodiment of step 430, as a fourth scenario S3, the value of $LCV_{S3}$ and $CAV_{S3}$ are calculated by the processor 120 using the following equation. The fourth scenario S3 is a scenario where the brightness level of the current frame is greater than the brightness level of the previous frame in the video sequence and the compensation value is adjusted by a constant only.

$$\Delta t = -CAV_F - \text{const\_update\_value}$$

$$CAV_{S3} = \begin{cases} \Delta t_1 & \text{if}(CAV_F < 0 \text{ AND } \Delta t \geq \text{const\_update\_value}) \\ \text{const\_update\_value} & \text{otherwise} \end{cases} \qquad \text{Eqn (3)}$$

$$LCV_{S3} = LCV_F + CAV_{S3}$$

According to Eqn (3), $CAV_{S3} = -CAV_F - \text{const\_update\_value}$ if $CAV_F$ is less than zero and $-CAV_F - \text{const\_update\_value}$ is greater than const_update_rate. Otherwise, $CAV_{S3} = \text{const\_update\_value}$.

Next, in a computing step 450 in the exemplary embodiment the processor 120 calculates values of $LCV_{S2}$ and $CAV_{S2}$ using the following equation for the third scenario S2.

$$\Delta t_1 = -CAV_F + \text{const\_update\_value}$$
$$\Delta t_2 = CAV_F - \text{const\_update\_value}$$

$$CAV_{S2} = \begin{cases} \Delta t_1 & \text{if}(CAV_F > 0 \text{ \& } \Delta t_1 \leq -\text{const\_update\_value}) \\ -\text{const\_update\_value} & \text{if}(CAV_F > 0 \text{ \& } \Delta t_1 > -\text{const\_update\_value}) \\ \Delta t_2 & \text{if}(CAV_F \leq 0 \text{ \& } -CAV_F < \text{max\_update\_value}) \\ CAV_F & \text{if}(CAV_F \leq 0 \text{ \& } -CAV_F \geq \text{max\_update\_value}) \end{cases}$$

Eqn (4)

$$LCV_{S2} = LCV_F + CAV_{S2}$$

The const_update_value and max_update_value in Eqn (4) are constant values externally set by a user and max_update_value must be greater than zero. A typical example of the values for const_update_value and max_update_value are, say 20 and 1 DCT coefficient. According to Eqn (4), if $CAV_F>0$, then $CAV_{S2}=-CAV_F+\text{const\_update\_value}$ and $CAV_{S2}$ is capped by $-\text{const\_update\_value}$. If $CAV_F \leq 0$, then the value of $CAV_{S2}$ is $CAV_{S2}=CAV_F-\text{const\_update\_value}$ and $CAV_{S2}$ is capped by max_update_value. Finally $LCV_{S2}$ is calculated with $LCV_F+CAV_{S2}$.

In an alternative embodiment of step 450, as a fifth scenario S4, the value of $LCV_{S4}$ and $CAV_{S4}$ are calculated using the following equation. The fifth scenario is where the brightness level of the current frame is lower than the brightness level of the previous frame in the video sequence and the compensation value is adjusted by a constant only.

$$\Delta t_1 = -CAV_F + \text{const\_update\_value}$$

$$CAV_{S4} = \begin{cases} \Delta t_1 & \text{if}(CAV_F > 0 \text{ \& } \Delta t_1 \leq -\text{const\_update\_value}) \\ -\text{const\_update\_value} & f(CAV_F > 0 \text{ \& } \Delta t_1 > -\text{const\_update\_value}) \\ \text{const\_update\_value} & \text{otherwise} \end{cases}$$

Eqn (5)

$$LCV_{S4} = LCV_F + CAV_{S4}$$

According to Eqn (5), $CAV_{S4}=-CAV_F$ const_update_value if $CAV_F$ is greater than zero and $-CAV_F+\text{const\_update\_value}$ is less than or equals to the −const_update_rate. If $CAV_F$ is greater than zero and $-CAV_F+\text{const\_update\_value}$ is greater than −const_update_rate, $CAV_{S4}=-\text{const\_update\_value}$. Otherwise, $CAV_{S4}=\text{const\_update\_value}$.

Next, computing step 460 computes the number of brighter blocks and darker blocks ($B_S$, $D_S$) of each scenario. The number of brighter blocks of scenarios S0, S1, and S2 are denoted $B_{S0}$, $B_{S1}$, and $B_{S2}$, respectively. The number of darker blocks of scenarios S0, S1, and S2 are denoted $D_{S0}$, $D_{S1}$, and $D_{S2}$, respectively. The process of step 460 is described in further detail below, with reference to FIG. 7.

Figure 7:
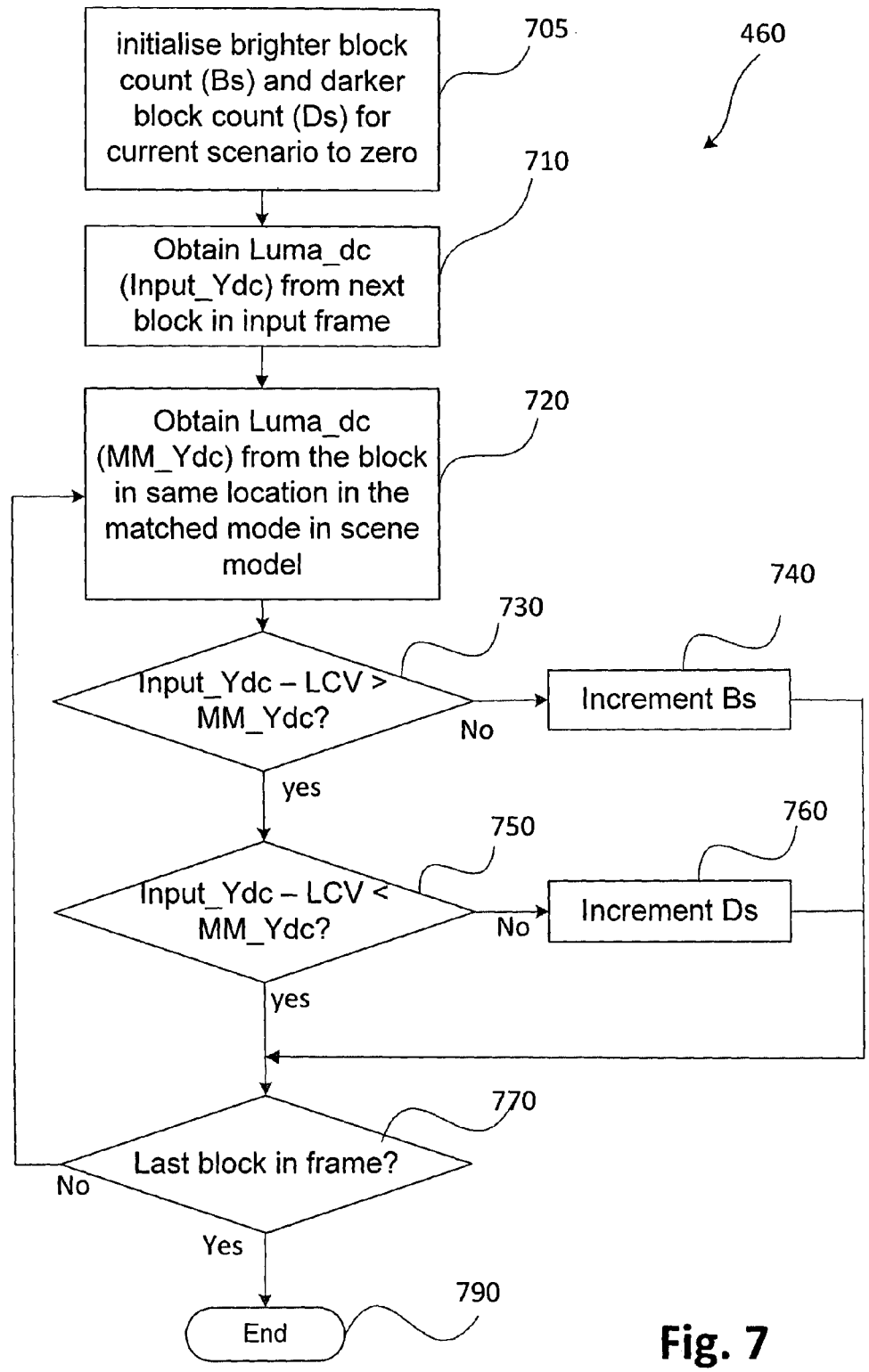
FIG. 7 is a flow chart of the process of determining the number of brighter blocks and the number of darker blocks for each of the scenarios.

FIG. 7 is a flow diagram illustrating an embodiment of the method 460 for calculating the number of brighter blocks and darker ($B_S$, $D_S$) for the scenarios S0, S1, and S2. The method is repeated for each of the scenarios S0, S1, and S2 to work out the values of $B_{S0}$, $B_{S1}$, $B_{S2}$, $D_{S0}$, $D_{S1}$, and $D_{S2}$. In the exemplary embodiment, the number of $B_S$, $D_S$ are computed using every block in the scene model 200.

The method 460 begins with an initializing step 705, which initializes the $B_S$ count and $D_S$ count to zero. For example, when computing for scenario S0, $B_{S0}$ and $D_{S0}$ are initialized to zero. Next, at step 710, the luma dc value of the block "i" is obtained from the input frame, and is denoted InputLuma$_{dc\_i}$.

Then at step 720, the luma dc value of block i in the matched element model 220 is obtained from the scene model 200, and is denoted MMLuma$_{dc\_i}$. Step 730 determines if the value of $B_S$ is to be incremented by determining whether the difference between Input_Ydc and LCV (Input_Ydc−LCV) is greater than MM_Ydc. If no, then the value of $B_S$ is to be incremented. Control passes to step 740, which increments $B_S$ in accordance with the following equation.

$$B_S{'}=B_S+1, \text{ if } ((\text{InputLuma}_{di\_i}-LCV_s)>MM\text{Luma}_{dc\_i})$$  Eqn (6)

Where $B_S{'}$ is the value of $B_S$ after calculation and $LCV_s$ is the LCV value for a given scenario, for example, for scenario S0, $LCV_s$ is $LCV_{S0}$. Control passes from step 740 to step 770

If at step 730 the difference between Input_Ydc and LCV (Input_Ydc−LCV) is greater than MM_Ydc, Yes, control passes from step 730 to step 750, which determines whether Input_Ydc−LCV is less than MM_Ydc. If no, $D_S$ is to be incremented. Control passes to step 760, which increments $D_S$ in accordance with the following equation.

$$D_S{'}=D_S+1, \text{ if } ((\text{InputLuma}_{dc\_i}-LCV_s)<MM\text{Luma}_{dc\_i})$$  Eqn (7)

Where $D_S{'}$ is the value of $D_S$ after calculation and $LCV_s$ is the LCV value for a given scenario, for example, for scenario S0, $LCV_s$ is $LCV_{S1}$. Control passes from step 760 to step 770.

If at step 750 Input_Ydc−LCV is less than MM_Ydc, Yes, control passes from step 750 to decision step 770, and neither $B_S$ nor $D_S$ is incremented.

At step 770, if more blocks in the frame need to be processed and the present block is not the last block in the frame, No, control goes back to step 720. If all blocks in the frame have been processed and the present block is the last block in the frame, Yes, then the process terminates at End step 790.

Returning to the description of method 330 in FIG. 4, the step 470 determines the final luminance compensation value using a cost function in terms of the value of $B_S$ and value of $D_S$, $F(B_S, D_S)$.

In the exemplary embodiment, the following form of the cost function $F(B_S, D_S)$ is used.

$$CF_{si}=|B_{si}-D_{si}|+(B_{si}+D_{si}), i\in 0,1,2$$

$$CF_j{'}=\min(CF_{s0},CF_{s1},CF_{s2})$$  Eqn (8)

In Eqn (8), "i" is a value ranged between 0, 1, and 2 denoting the three scenarios S0, S1, and S2 in the preferred embodiment. In particular, it is noted that the metric (cost function $F(B_S, D_S)$) is based on the difference between the set of brightness count and darkness count, as well as the sum of the set of brightness count and darkness count. However, in an alternative embodiment, the "i" is a value ranged between 0, 1, 2, 3, and 4 denoting the scenarios S0, S1, S2, S3 and S4, in which S0, S1, and S2 are the same as the S0, S1, and S2 in the preferred embodiment and the scenarios S3 and S4 are the scenarios calculating LCV and CAV values using Eqn (3) and Eqn (5). Also, in the alternative embodiment, the value of $CF_f$ is computed using the $CF_f=\min(CF_{s0}, CF_{s1}, CF_{s2}, CF_{s3}, CF_{s4})$. $CF_{si}$ is the resulting value of the cost function $|B_{si}-D_{si}|+(B_{si}+D_{si})$. The purpose of Eqn (8) is to find the value of $CF_f$ and $CF_f$ is determined by finding the minimum value of $CF_{s0}$, $CF_{s1}$, and $CF_{s2}$. A minimum value of $CF_f$ indicates after luminance compensation, the lighting condition is most stable. By stable lighting condition, the input frame has the least amount of blocks with different luminance value compared to the matched element models in the scene model, hence the value for $(B_s+D_s)$ is minimized. However, when $(B_{S0}+D_{S0})=(B_{S1}+D_{S1})=(B_{S2}+D_{S2})$, the $|B_s-D_s|$ term is employed to indicate that after luminance compensation, a scenario with similar B and D value is preferred.

In an alternative embodiment, the method of counting the value of $B_S$ and value of $D_S$, described in FIG. 7, is performed for all the blocks that have a background element model as their matched element model for a previous frame.

According to Eqn (8), the values of $CF_{s0}$, $CF_{s1}$ and $CF_{s2}$ can be the same value and that makes it hard to determine which scenario is the winning scenario. Therefore, in the preferred embodiment, a penalty factor is also applied. The following equations show the conditions in which a constant penalty value is applied in each scenario.

$$CF_{s0} = \begin{cases} (|B_{s0} - D_{si}| + (B_{s0} + D_{s0})) \times \text{const\_mutiplier} + \text{const\_penalty\_value} & \text{if } (B_{s0} \neq D_{s0}) \\ (|B_{s0} - D_{s0}| + (B_{s0} + D_{s0})) \times \text{const\_multiplier} & \text{otherwise} \end{cases} \quad \text{Eqn (9)}$$

$$CF_{s1} = \begin{cases} (|B_{s1} - D_{s1}| + (B_{s1} + D_{s1})) \times \text{const\_multiplier} + \text{const\_penalty\_value} & \text{if } (B_{s1} \leq D_{s1}) \\ (|B_{s1} - D_{s1}| + (B_{s1} + D_{s1})) \times \text{const\_multiplier} & \text{otherwise} \end{cases} \quad \text{Eqn (10)}$$

$$CF_{s1} = \begin{cases} (|B_{s1} - D_{s1}| + (B_{s1} + D_{s1})) \times \text{const\_multiplier} + \text{const\_penalty\_value} & \text{if}(B_{s1} \geq D_{s1}) \\ (|B_{s1} - D_{s1}| + (B_{s1} + D_{s1})) \times \text{const\_multiplier} & \text{otherwise} \end{cases} \quad \text{Eqn(11)}$$

In Eqn (7), the value of $CF_{s0}$ is $(|B_{s0}-D_{s0}|+(B_{s0}+D_{s0}))\times\text{const\_multiplier}+\text{const\_penalty\_value}$ if the number of brighter blocks B is not the same as the number of darker blocks D. However, if the value of $B_{S0}$ is the same as $D_{S0}$ in Scenario S0, then no penalty is given. This indicates that the scenario S0 described in the hypothesize step 401 will receive a penalty when this hypothesis scenario S0 is not an appropriate hypothesis.

In Eqn (10), the value of $CF_{s1}$ is $(|B_{s1}-D_{s1}|+(B_{s1}+D_{s1}))\times\text{const\_multiplier}+\text{const\_penalty\_value}$ if the brighter blocks count $B_{S1}$ is less than or equal to the darker block count $D_{S1}$ and no penalty is given if the brighter blocks count $B_{S1}$ is greater than the darker block count $D_{S1}$. This indicates that the scenario S1 described in the hypothesize step 401 will receive a penalty when this hypothesis scenario S1 is not an appropriate hypothesis.

In Eqn (11), the value $CF_{s2}$ is $(|B_{s2}-D_{s2}|+(B_{s2}+D_{s2}))\times\text{const\_multiplier}+\text{const\_penalty\_value}$ if the brighter blocks count $B_{S2}$ is greater than or equal to the darker block count $D_{S2}$ and no penalty is given if the brighter blocks count $B_{S2}$ is less than the darker block count $D_{S2}$. This indicates that the scenario S2 described in the hypothesize step 401 will receive a penalty when this hypothesis scenario S2 is not an appropriate hypothesis. The const_multiplier is a user defined parameter and a typical value is set to 2.

After the value of $CF_f$ is determined, the winning scenario $S_i$ where $i \in \{0,1,2\}$ is chosen in the exemplary embodiment. In the exemplary embodiment, the scenario with the lowest cost function value is chosen as the winning scenario for the frame. Then the final $CAV_F$ and $LCV_F$ are determined using the following equation, where $CAV_{Si}$ and $LCV_{Si}$ are the CAV and LCV values of the winning scenario $S_i$.

$CAV_F=CAV_{si}$ $LCV_F=LCV_{si}$ \hfill Eqn (12)

When the final luminance compensation value and compensation adjustment value are determined, they are stored in memory 150. The values $CAV_F$ and $LCV_F$ are used in steps 405, 410, and 430 for the next frame.

Figure 8:
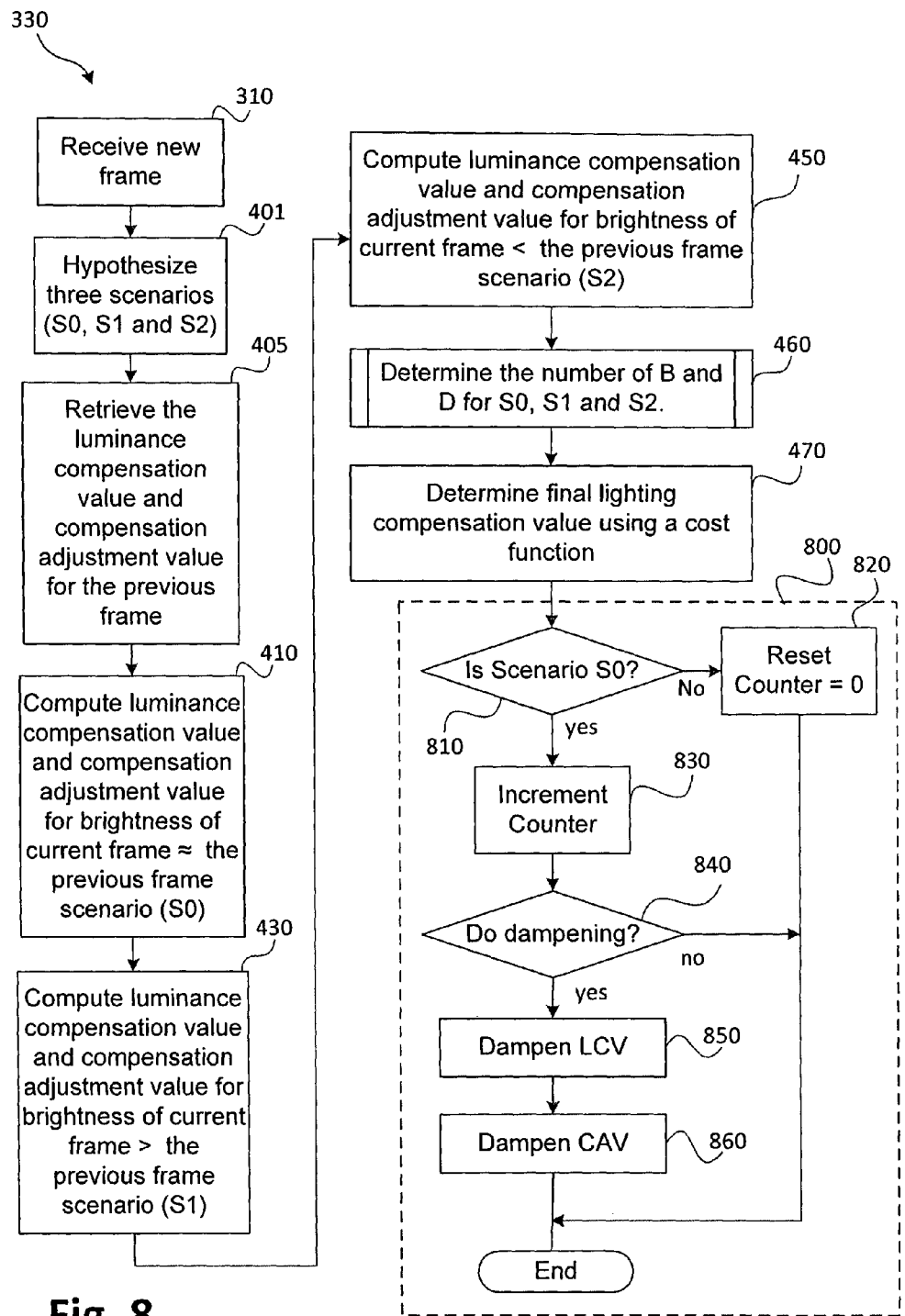
FIG. 8 is flow chart for an alternative embodiment for calculating the luminance compensation value for current frame that includes dampening.

An alternative embodiment of method 330 is described with reference to FIG. 8. In FIG. 8, an additional step 800 is added to the embodiment of method 330 described with reference to FIG. 4. The step 800 is called dampening. The purpose of dampening is to bring the values of $CAV_F$ and $LCV_F$ closer to zero when scenario S0 has been the winning scenario for a number of consecutive frames. Specifying the number of consecutive frames allows the system to control how stable the lighting condition has to be before dampening is applied. As a result, dampening allows the scene model 200 to adapt to the global luminance change in a scene. Further, it is advantageous to set the dampening rate to be the same as the rate of scene model update, so that when the scene model is finally adapted to the lighting in the scene when the lighting condition is stable, the value of $LCV_F$ is zero. As a result of step 470 in FIG. 8, the winning scenario is determined. At step 810, the processor 120 checks whether or not the winning scenario is scenario S0. If the winning scenario is not S0, a Dampening Factor Counter (DFC) is reset to zero at step 820.

If the winning scenario determined by step 470 was scenario S0, the DFC counter is incremented. At step 840, the processor determines if dampening should be applied to value of $CAV_F$ and value of $LCV_F$. In one embodiment, the processor 120 allows dampening as soon as two consecutive frames have scenario S0 as the winning scenario. In another embodiment, the processor 120 only allows dampening when DCF reaches a predetermined threshold, say 5. If the processor 120 does not allow dampening, the method 800 goes to end state.

If dampening is allowed by step 840, then the following equations are used to adjust the values of $CAV_F$ at step 860 and value of $LCV_F$ at step 850.

$$CAV'_F = \begin{cases} CAV_F - \text{dampen\_factor} & \text{if}(CAV_F > 0) \\ CAV_F + \text{dampen\_factor} & \text{if}(CAV_F < 0) \end{cases} \quad \text{Eqn (13)}$$

$$LCV'_F = \begin{cases} LCV_F - \text{const\_rate} & \text{if}(LCV_F > 0) \\ LCV_F + \text{const\_rate} & \text{if}(LCV_F < 0) \end{cases} \quad \text{Eqn (14)}$$

As shown in Eqn (13), $CAV_F'$ is reduced by a dampen_factor if the value of $CAV_F$ computed by step 470 is greater than zero; and $CAV_F'$ is increased by a dampen_factor if the value of $CAV_F$ computed by step 470 is less than zero. Dampen_factor is a user defined constant, say 1.

As shown in Eqn (14), $LCV_F'$ is reduced by a const_rate if the value of $LCV_F$ computed by step 470 is greater than zero; and $LCV_F'$ is increased by a const_rate if the value of $LCV_F$ computed by step 470 is less than zero. Const_rate is a user defined constant, say 1.

Returning to the description of method 300 in FIG. 3, the adjustment step 350 applies the values $LCV_F$ computed in method 330 to the $InputLuma_{dc\_i}$ described in step 710 in an input image. The process of adjusting luminance compensation is detailed in FIG. 5.

Figure 5:
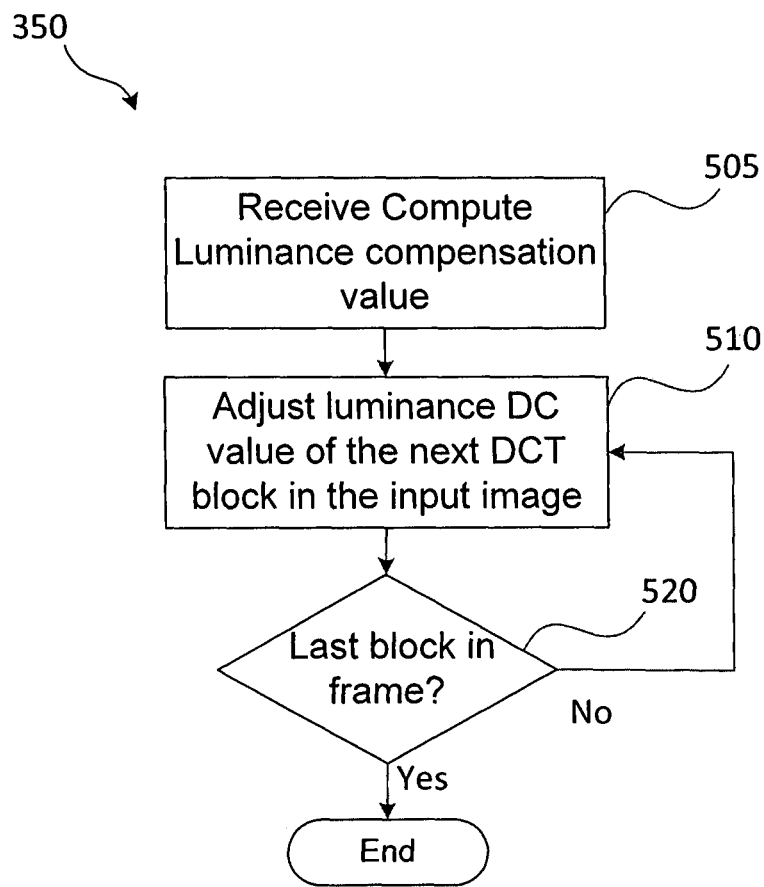
FIG. 5 is a flowchart of a process for applying the luminance compensation value for current frame.

In FIG. 5, at receiving step 505, the $LCV_F$ computed in method 330 is received. Next, at step 510, the processor 120 adjusts the luminance DC value of the next block in the input image using the following equation.

$$InputLuma_{dc\_i}' = InputLuma_{dc\_i} - LCV_F \quad \text{Eqn (15)}$$

Then at step 520, if there are more DCT blocks that are unprocessed in the input image, then the process goes back to step 510. If there are no more DCT blocks remaining unprocessed in the input image, then the process ends.

The set of representations in FIG. 6 shows how the application of the proposed dynamic luminance adjustment method can affect the output of a background modelling system.

Figure 6A:
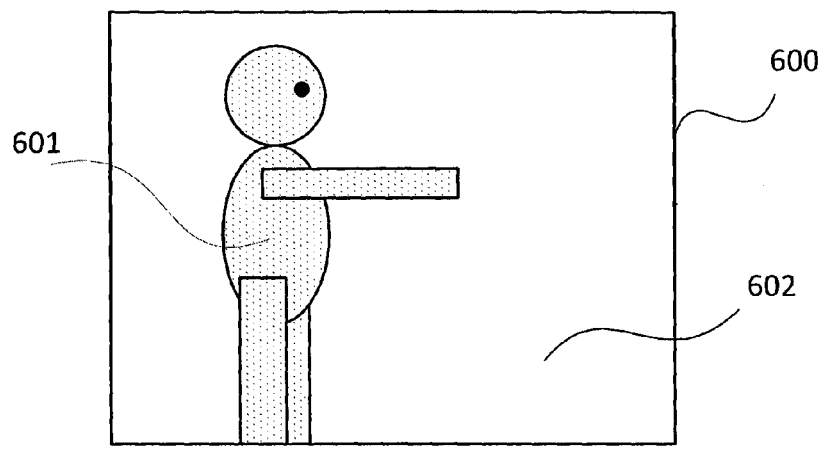
FIGS. 6A-6C illustrate the effect of the implementation of the dynamic luminance adjustment method on the output of a background modelling system.

FIG. 6A shows an input image 600 to a background modelling system, containing a foreground object 601 and a background 602.

Figure 6B:
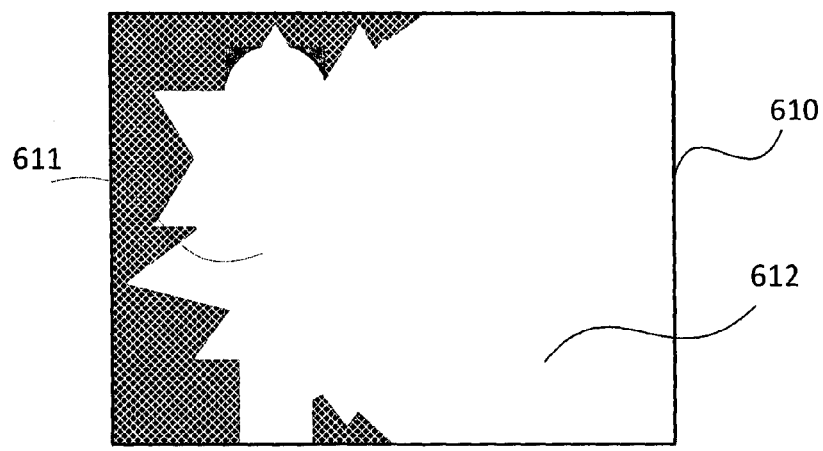

FIG. 6B shows an output image 610 from the background modelling system of FIG. 6A if no luminance adjustment method is implemented. The detection of genuine foreground 611 in this case is affected by false detections 612 caused by a whole-scene luminance change.

Figure 6C:
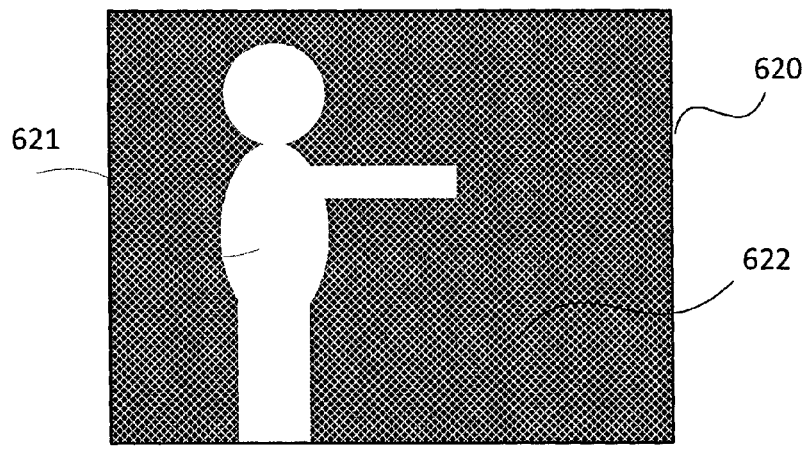

FIG. 6C shows an output image 620 from the background modelling system of FIG. 6A, which implements an embodiment of the proposed dynamic luminance adjustment method. The genuine foreground 621 is now distinguishable from any false detection in background 622, caused by a whole-scene luminance change.

Figure 9:
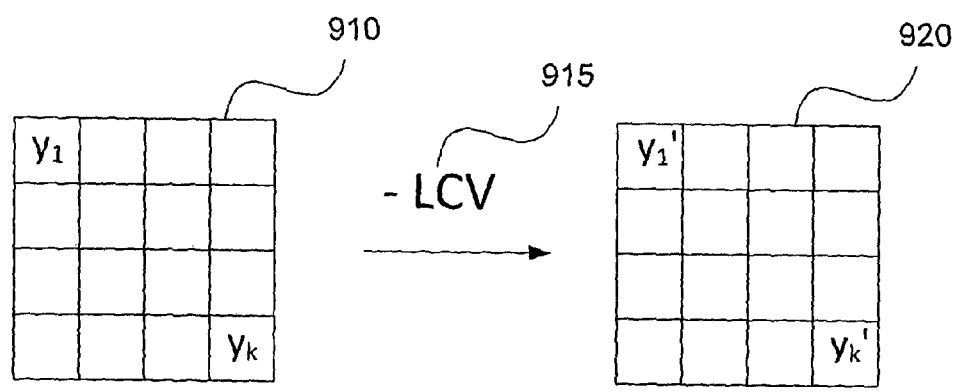
FIG. 9 is a schematic block diagram representation of a luminance compensation value being applied to an input frame.

FIG. 9 is a schematic block diagram representation of a luminance compensation value (LCV) 915 being applied to an input frame 910. The input frame 910 includes a plurality of luminance values $y_1, \ldots, y_k$ derived from the visual elements of the input frame of a video sequence. The luminance compensation value 915 is applied to each of the luminance values $y_1, \ldots, y_k$ to produce a compensated frame 920 with adjusted luminance values $y_1', \ldots, y_k'$, where $y_1' = y_1 - LCV$. Thus, each luminance value in the input frame 910 is adjusted by applying the luminance compensation value 915 to produce the compensated frame 920.

Figure 10:
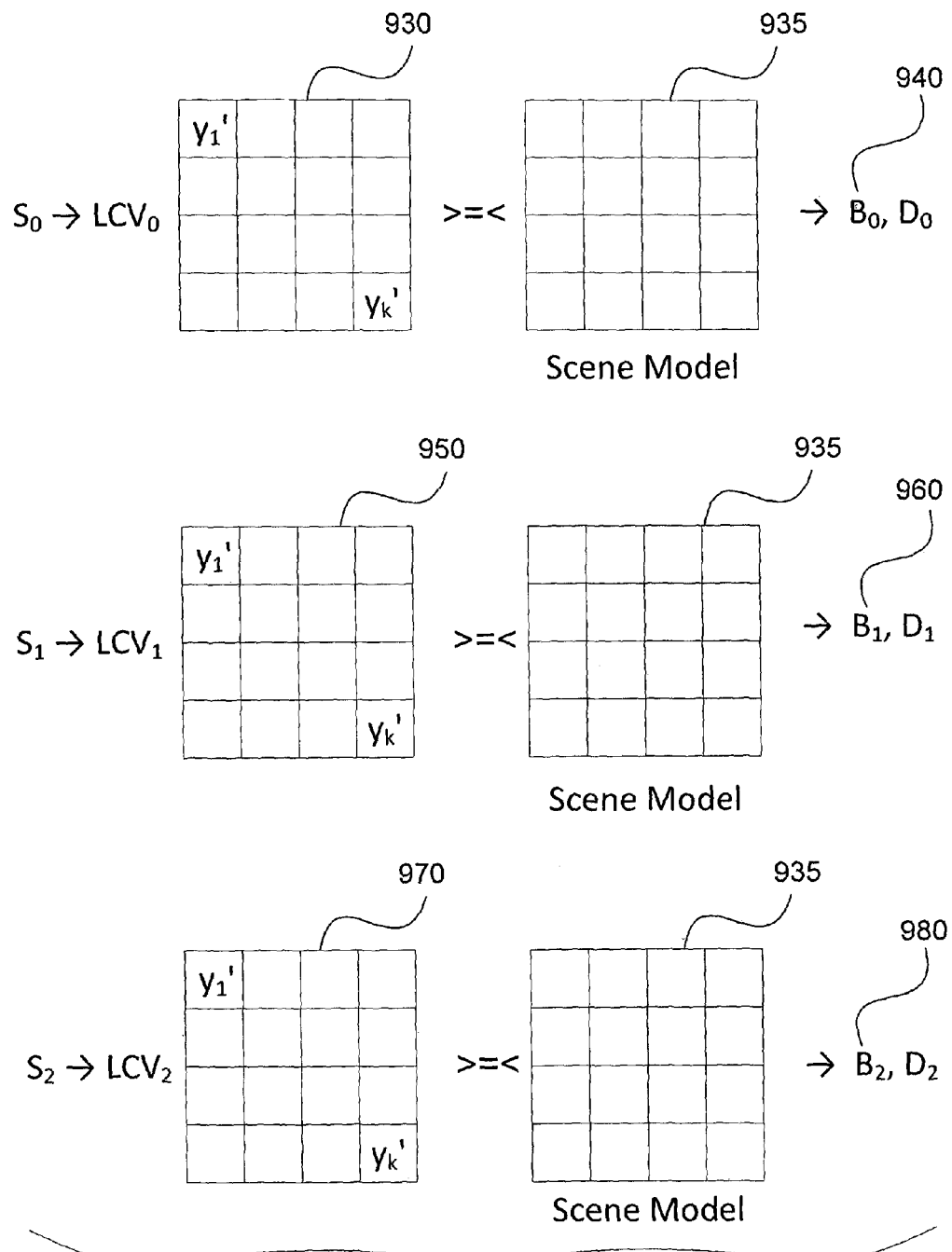
FIG. 10 is a schematic block diagram representation of a comparison between adjusted luminance values and a scene model to determine a set of brightness and darkness counts.

FIG. 10 is a schematic block diagram representation illustrating a comparison between adjusted luminance values and a scene model for each of three scenarios to determine a set of brightness and darkness counts. Each of the three scenarios has an associated luminance compensation value. A first scenario $S_0$ has an associated first luminance compensation value $LCV_0$, a second scenario $S_1$ has an associated second luminance compensation value $LCV_1$, and a third scenario $S_2$ has an associated third luminance compensation value $LCV_2$.

In the first scenario $S_0$, the first luminance compensation value $LCV_0$ is applied to an input frame that includes luminance values $y_1, \ldots, y_k$ to produce a first compensated frame 930 that includes adjusted luminance values $y_1', \ldots, y_k'$. The first compensated frame 930 is compared to a scene model 935, to determine the number of adjusted luminance values in the first compensated frame that are lighter than the corresponding positions in the scene model and the number of adjusted luminance values in the first compensated frame that are darker than the corresponding positions in the scene model. This comparison produces a first set of brightness and darkness count $B_0$, $D_0$ 940.

In the second scenario $S_1$, the second luminance compensation value $LCV_1$ is applied to an input frame that includes luminance values $y_1, \ldots, y_k$ to produce a second compensated frame 950 that includes adjusted luminance values $y_1', \ldots, y_k'$. The second compensated frame 950 is compared to the scene model 935, to determine the number of adjusted luminance values in the second compensated frame that are lighter than the corresponding positions in the scene model and the number of adjusted luminance values in the second compensated frame that are darker than the corresponding positions in the scene model. This comparison produces a second set of brightness and darkness count $B_1$, $D_1$ 960.

In the third scenario $S_2$, the third luminance compensation value $LCV_2$ is applied to an input frame that includes luminance values $y_1, \ldots, y_k$ to produce a third compensated frame 970 that includes adjusted luminance values $y_1', \ldots, y_k'$. The third compensated frame 970 is compared to the scene model 935, to determine the number of adjusted luminance values in the third compensated frame that are lighter than the corresponding positions in the scene model and the number of adjusted luminance values in the third compensated frame that are darker than the corresponding positions in the scene model. This comparison produces a third set of brightness and darkness count $B_2$, $D_2$ 980.

The method utilises the sets of brightness and darkness counts $B_0$, $D_0$ 940, $B_1$, $D_1$ 960, and $B_2$, $D_2$ 980 to select a scenario from the first, second, and third scenarios. The adjusted luminance values from the compensated frame associated with the selected scenario is then selected as the adjusted set of luminance values associated with the set of visual elements in the image of the video sequence.

The three scenarios based method described herein has the advantage of accurate luminance compensation in complex scenarios such as when a foreground object occludes the scene. The proposed method is also robust to noise, because the LCV value is changed depending on the scenario and accelerates depending on the scenario. Due to the three scenarios based approach, the method is self adjusting to avoid over compensation or under compensation.

INDUSTRIAL APPLICABILITY

The described method is applicable to the imaging and data processing industries and particularly for the imaging applications associated with capturing and processing sequences of images.

The foregoing describes only some embodiments of the present invention, and modifications and/or changes can be made thereto without departing from the scope and spirit of the invention, the embodiments being illustrative and not restrictive.

The invention claimed is:

1. A method of adjusting a set of luminance values associated with a set of visual elements in a current frame of a video sequence for object detection, the method comprising the steps of:
    determining, for each of a plurality of scenarios, a set of adjusted luminance values based on a corresponding luminance compensation value, each scenario being based on a current frame brightness level and a previous frame brightness level;
    accumulating, for each scenario, an associated set of brightness counts and darkness counts of the current frame based on the set of adjusted luminance values;
    calculating a metric for each scenario based on the associated set of brightness counts and darkness counts;
    selecting one of the plurality of scenarios based on the calculated metric, and evaluation of the calculated metric for each of the plurality of scenarios; and
    selecting the set of adjusted luminance values associated with the selected scenario as an adjusted set of luminance values associated with the current frame of the video sequence.

2. The method according to claim 1, wherein the metric for each scenario is calculated based on a difference between the associated set of brightness counts and darkness counts and a sum of the associated set of brightness counts and darkness counts.

3. The method according to claim 1, wherein each brightness count is indicative of a number of visual elements that has an adjusted luminance value that is brighter than a luminance value of a scene model or a previous frame and each darkness count is indicative of a number of visual elements that has an adjusted luminance value that is darker than a luminance value of the scene model or the previous frame.

4. The method according to claim 1, wherein the plurality of scenarios comprises:
    a first scenario where a brightness level of the current frame is substantially the same as an overall brightness level of a previous frame in the video sequence and a compensation value and compensation adjustment value for the previous frame are suitable for the current frame;
    a second scenario where a brightness level of the current frame is greater than a brightness level of the previous frame in the video sequence and a compensation value and compensation adjustment value for the previous frame are adjusted to the current frame; and
    a third scenario where a brightness level of the current frame is less than a brightness level of the previous frame in the video sequence, and a compensation value and compensation adjustment value for the previous frame are adjusted to the current frame.

5. The method according to claim 4, wherein the plurality of scenarios comprises at least one of:
    a fourth scenario where a brightness level of the current frame is greater than a brightness level of the previous frame in the video sequence and the compensation value is adjusted by a constant only; and
    a fifth scenario where a brightness level of the current frame is lower than a brightness level of the previous frame in the video sequence and the compensation value is adjusted by a constant only.

6. The method according to claim 1, wherein each visual element in the current frame is associated with a corresponding luminance value.

7. The method according to claim 6, wherein said set of adjusted luminance values for each scenario is derived from the luminance compensation value associated with that scenario and the corresponding luminance values associated with the visual elements in the current frame.

8. The method according to claim 1, comprising the further step of utilising said adjusted set of luminance values to perform foreground/background object detection on the current frame.

9. An apparatus for adjusting a set of luminance values associated with a set of visual elements in a current frame of a video sequence for object detection, said apparatus comprising:
    a processor;
    a storage device coupled to the processor; and
    a program stored on the storage device and comprising code executable by the processor for performing the steps of:
        determining, for each scenario, a set of adjusted luminance values based on a luminance compensation value associated with the each scenario, each scenario being based on a current frame brightness level and a previous frame brightness level;
        accumulating, for each scenario, an associated set of brightness counts and darkness counts obtained based on the set of adjusted luminance values;
        calculating a metric for each scenario based on the associated set of brightness counts and darkness counts;
        selecting one of the scenarios based on the calculated metric, and evaluation of the calculated metric for each of the plurality of scenarios; and
        selecting the set of adjusted luminance values associated with the selected scenario as an adjusted set of luminance values associated with the current frame of the video sequence.

10. The apparatus according to claim 9, wherein the metric for each scenario is calculated based on a difference between the associated set of brightness counts and darkness counts and a sum of the associated set of brightness counts and darkness counts.

11. The apparatus according to claim 10, further comprising:
    a lens system for focussing on a scene captured by said video sequence;
    a camera module coupled to said lens system to store each frame in said video sequence.

12. The apparatus according to claim 9, wherein each brightness count is indicative of a number of visual elements that has an adjusted luminance value that is brighter than a luminance value of a scene model or a previous frame and each darkness count is indicative of a number of visual elements that has an adjusted luminance value that is darker than a luminance value of the scene model or the previous frame.

13. The apparatus according to claim 9, wherein the plurality of scenarios comprises:
    a first scenario where a brightness level of the current frame is substantially the same as an overall brightness level of a previous frame in the video sequence and a compensation value and compensation adjustment value for a previous frame are suitable for the current frame;

a second scenario where a brightness level of the current frame is greater than a brightness level of a previous frame in the video sequence and a compensation value and compensation adjustment value for a previous frame are adjusted to the current frame; and a third scenario where a brightness level of the current frame is less than a brightness level of a previous frame in the video sequence, and a compensation value and compensation adjustment value for a previous frame are adjusted to the current frame.

14. The apparatus according to claim 13, wherein the plurality of scenarios comprises at least one of:

a fourth scenario where a brightness level of the current frame is greater than a brightness level of a previous frame in the video sequence and the compensation value is adjusted by a constant only;

a fifth scenario where a brightness level of the current frame is lower than a brightness level of the previous frame in the video sequence and the compensation value is adjusted by a constant only.

15. The apparatus according to claim 9, wherein each visual element in the current frame is associated with a corresponding luminance value.

16. The apparatus according to claim 15, wherein said set of adjusted luminance values for each scenario is derived from the luminance compensation value associated with that scenario and the corresponding luminance values associated with the visual elements in the current frame.

17. The apparatus according to claim 9, comprising the further step of utilising said adjusted set of luminance values to perform foreground/background object detection on the current frame.

18. A non-transitory computer readable storage medium having a program recorded thereon, the program being executable by computer to adjust a set of luminance values associated with a set of visual elements in a current frame of a video sequence for object detection, the program comprising:

code for determining, for each of a plurality of scenarios, a set of adjusted luminance values based on a corresponding luminance compensation value, each scenario being based on a current frame brightness level and a previous frame brightness level;

code for accumulating, for each scenario, an associated set of brightness counts and darkness counts of the current frame based on the set of adjusted luminance values;

code for calculating a metric for each scenario based on the associated set of brightness counts and darkness counts;

code for selecting one of the plurality of scenarios based on the calculated metric, and evaluation of the calculated metric for each of the plurality of scenarios; and code for selecting the set of adjusted luminance values associated with the selected scenario as an adjusted set of luminance values associated with the current frame of the video sequence.

\* \* \* \* \*